United States Patent
Neeley et al.

[11] Patent Number: 6,038,893
[45] Date of Patent: *Mar. 21, 2000

[54] LOCKOUT DEVICE

[75] Inventors: Rocky E. Neeley; James N. Lane, both of Rio Rancho, N.Mex.

[73] Assignee: Neelchine Engineering, Inc., Albuquerque, N.Mex.

[*] Notice: This patent is subject to a terminal disclaimer.

[21] Appl. No.: 09/060,966

[22] Filed: Apr. 15, 1998

Related U.S. Application Data

[63] Continuation-in-part of application No. 08/845,680, Apr. 25, 1997, which is a continuation-in-part of application No. 08/656,403, May 31, 1996, which is a continuation-in-part of application No. 08/317,127, Oct. 3, 1994, Pat. No. 5,664,447.

[51] Int. Cl.$^7$ .................................................. F16K 35/00
[52] U.S. Cl. ................................ 70/175; 70/178; 70/221
[58] Field of Search ...................... 70/175–180, 188–190, 70/149, 218, 221–223, 472, 204, 236, 422, DIG. 9; 292/DIG. 27; 137/384.8, 385; 251/95, 101, 104, 230

[56] References Cited

U.S. PATENT DOCUMENTS

| | | |
|---|---|---|
| 173,853 | 8/1876 | Gardiner . |
| 440,714 | 11/1890 | Lamb et al. . |
| 441,357 | 11/1890 | Crowell . |
| 485,899 | 11/1892 | Tannenberg . |
| 617,648 | 1/1899 | Fergusson et al. . |
| 1,026,039 | 5/1912 | Humphrey . |
| 1,154,389 | 9/1915 | Fogalsang . |
| 1,248,204 | 11/1917 | Thomsen . |
| 1,250,127 | 12/1917 | Beers . |
| 1,297,038 | 3/1919 | Timmerhoff . |
| 1,302,933 | 5/1919 | Langton . |
| 1,329,913 | 2/1920 | McGuire . |
| 1,366,114 | 1/1921 | Boggs . |
| 1,380,675 | 6/1921 | Myers . |
| 1,464,854 | 8/1923 | Rose . |
| 1,511,351 | 10/1924 | Michaud . |
| 1,516,418 | 11/1924 | Woodward et al. . |
| 1,526,047 | 2/1925 | Butterworth . |
| 1,596,230 | 8/1926 | Benford . |
| 1,640,763 | 8/1927 | Geyer et al. . |
| 1,672,137 | 6/1928 | Seng . |
| 1,843,072 | 1/1932 | Stone . |
| 2,064,769 | 12/1936 | Thompson . |
| 2,316,956 | 4/1943 | Heath . |
| 2,795,129 | 6/1957 | Schoepe . |
| 2,838,270 | 6/1958 | Danielson . |
| 3,134,291 | 5/1964 | Barry . |
| 3,340,709 | 9/1967 | Callahan . |
| 4,073,165 | 2/1978 | Grundstrom et al. . |

(List continued on next page.)

FOREIGN PATENT DOCUMENTS

| | | |
|---|---|---|
| 655094 | 4/1929 | France . |
| 732468 | 3/1943 | Germany . |
| 310201 | 8/1933 | Italy . |
| 30321 | 1/1920 | Norway . |
| 7570 | of 1886 | United Kingdom . |
| 241497 | 6/1925 | United Kingdom . |
| 2168131 | 6/1986 | United Kingdom . |

*Primary Examiner*—Suzanne Dino Barrett
*Attorney, Agent, or Firm*—Rod D. Baker; Deborah A. Peacock

[57] ABSTRACT

A locking device for use in connection with an energy controlling apparatus, such as a valve, or regulator, to prevent unauthorized persons from changing the position of a rotatable shaft of the apparatus that controls the amount of energy that flows through the apparatus. The locking device includes a handle used to manually set the position of the shaft. It also includes a gear that is rotatably mounted in the handle and is fixed to the shaft of the apparatus. A first locking mechanism carried by the handle mechanically and selectively couples the handle and the gear through a key access to the lock. A spring-biased ratchet mechanism may be provided to permit rotation of the shaft in one direction only. A personal locking mechanism with only a single key is selectively lockable to the handle so that in the locked position it prevents access to the first locking mechanism.

21 Claims, 24 Drawing Sheets

U.S. PATENT DOCUMENTS

| | | |
|---|---|---|
| 4,235,258 | 11/1980 | Uno et al. . |
| 4,450,697 | 5/1984 | Ellis . |
| 4,723,569 | 2/1988 | Ellis . |
| 4,899,564 | 2/1990 | Gilbert . |
| 5,085,063 | 2/1992 | Van Dyke . |
| 5,092,359 | 3/1992 | Wirth et al. . |
| 5,203,187 | 4/1993 | Kane . |
| 5,214,982 | 6/1993 | Shieh . |
| 5,415,017 | 5/1995 | Benda et al. . |
| 5,425,256 | 6/1995 | Crosby . |
| 5,664,447 | 9/1997 | Neeley . |

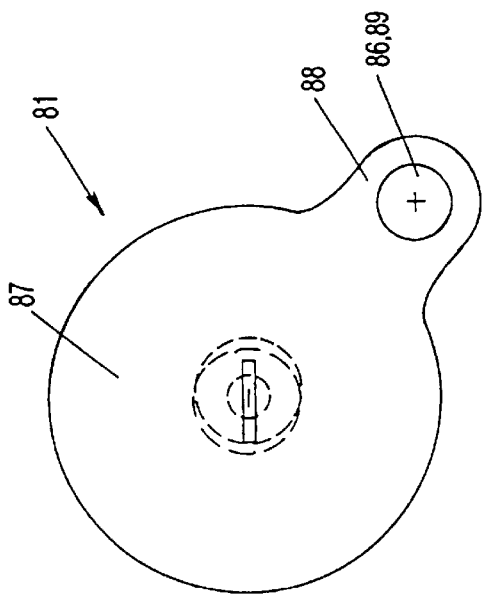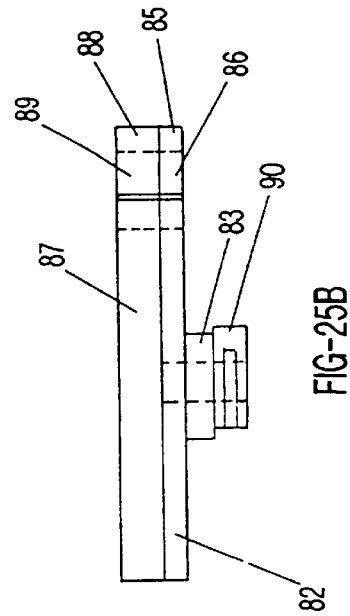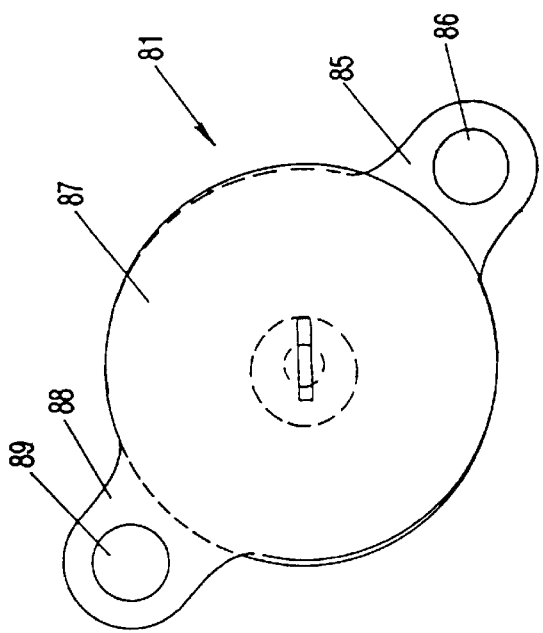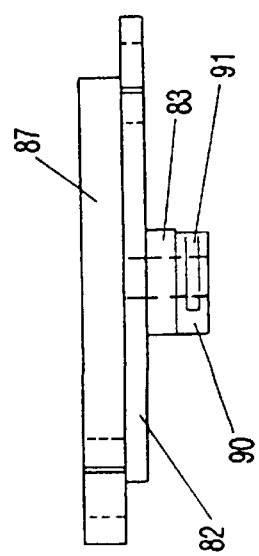

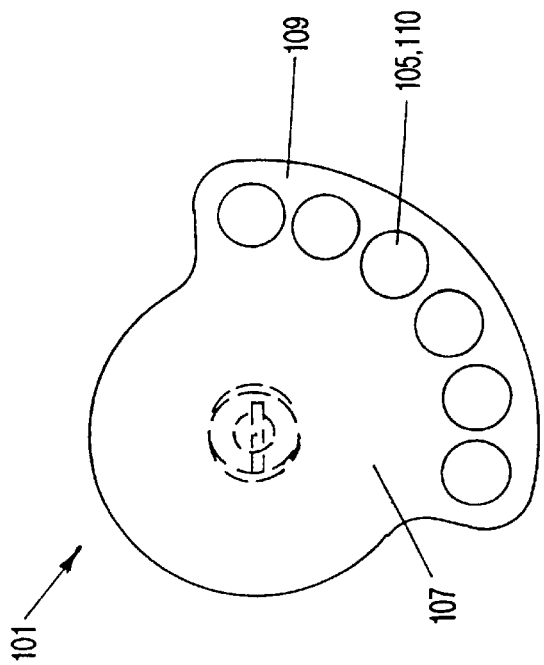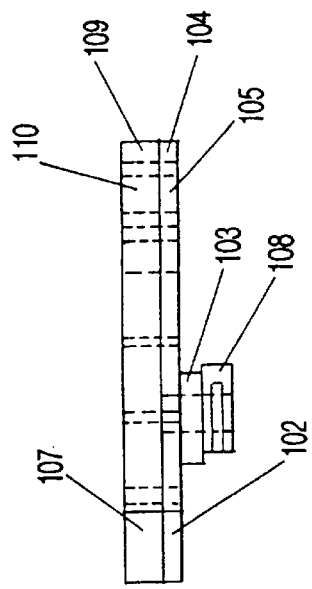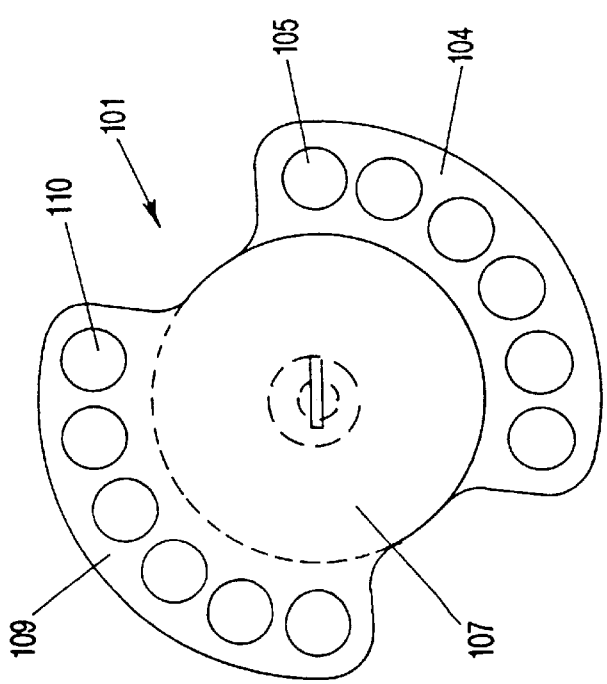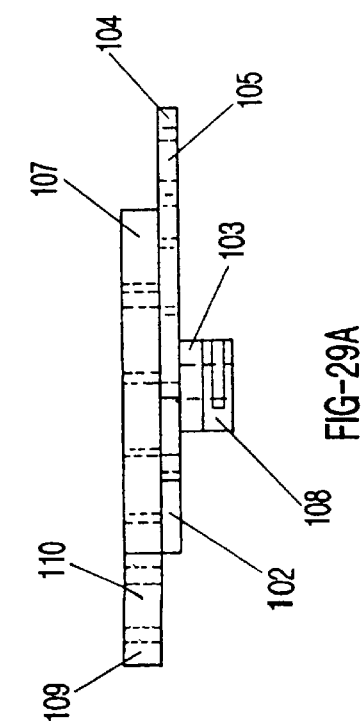

LOCKOUT DEVICE

CROSS-REFERENCE TO RELATED APPLICATIONS

This application is a continuation-in-part application of application Ser. No. 08/845,680, filed Apr. 25, 1997, which was a continuation-in-part of application Ser. No. 08/656,403, filed May 31, 1996, which was a continuation-in-part of parent application Ser. No. 08/317,127, filed Oct. 3, 1994 now U.S. Pat. No. 5,664,447.

BACKGROUND OF THE INVENTION

1. Field of the Invention (Technical Field)

The present invention relates to safety devices for preventing tampering or accidental change of the manually set position of a rotatable shaft, such as the shaft on a valve or regulator that controls the flow of fluid.

2. Background Art

Present lockout devices are designed to lock the handle on a valve or regulator where the handle is part of the original valve or regulator supplied by the manufacturer. Typically in these lockout devices, an enclosure is formed around the handle with a padlock that locks the enclosure in place to prevent access to the handle thus preventing the rotational position setting of the handle from being altered either accidentally or out of ignorance or maliciousness. Other lockout devices show a lock assembly that is housed within a cast valve body that with the aid of a key controls rotation of the valve shaft.

Examples of such locks are shown in U.S. Pat. Nos. 440,714 (Lamb), 441,357 (Crowell), 1,154,389 (Fogalsong), 1,248,204 (Thomsen), 1,250,127 (Beers), 1,380,675 (Myers), 1,526,047 (Butterworth), 1,672,137 (Seng), 1,843,072 (Stone), 2,795,129 (Schoepe), 3,134,291 (Barry), 5,085,063 (Van Dyke). Additional patents were cited in the prosecution of the parent application from which this application is a continuation-in-part.

The principal objection to all of the above-identified lockout devices is the complexity of the mechanism which causes problems in reliability, increased manufacturing cost, and thus an increased price. Furthermore, many of these lockout devices require that the valve or regulator body handle be specially cast so as to house the locking assembly. Accordingly, the locking device is part of the valve or regulator when purchased and each valve or regulator manufacturer may have different types of devices which prevents uniformity of a single lockout device used throughout a manufacturing plant. It would be highly desirable to have a lockout device that could be used for a wide variety of different manufacturers' valves or regulators so that plant personnel could be taught to operate a single type of lockout device even though valves and regulators from different manufacturers are used in the same industrial plant.

Additionally, the prior art does not address the problem posed to industrial plant managers attempting to comply with regulations of the Occupational Safety and Health Act (OSHA). In particular, in 29 C.F.R. §1910.147, the regulations set forth the responsibility of a plant operator for the control of hazardous energy. These devices are typically referred to as "lockout/tagout" devices. The purpose, as set forth in the regulations, is to prevent the "unexpected energization or start-up of the machines or equipment, or release of stored energy that could cause injury to employees undertaking servicing and maintenance of machines and equipment in the plant." According to the regulations, "lockout" requires the "placement of a lockout device on an energy-isolating device, in accordance with an established procedure, insuring that the energy-isolating device and the equipment being controlled cannot be operated until the lockout device is removed." Such safety lockout device requires some personnel-controlled means for locking, such as a key- or combination-operated lock. The regulation further provides that safety lockout devices shall be standardized within the facility with respect to color, shape, or size.

An important feature of the safety lockout procedure is that the safety lockout device must be under the exclusive control of the authorized employee performing the servicing or maintenance. Accordingly, it is understood that compliance with these regulations will require that a safety lockout device has at least one key, or combination, that can be used only by the authorized service/maintenance person to override any other lockout device that otherwise may be applied to the energy-controlling device.

If it is desirable to have a lockout device to maintain a rotatable shaft in a fixed manual setting, during normal operation of the plant, there may be provided an "operations" lockout device that is available to the process control engineer, supervisor, or other employee responsible for establishing the settings on all energy-controlling devices. The OSHA or "service/maintenance" or "safety" or "personal" lockout device then must supercede this operations lockout device so that a second key or combination lock under the exclusive control of service personnel can be applied to prevent access to the operations lockout device.

SUMMARY OF THE INVENTION

The present invention comprises a lockout device for a rotating shaft, such as the shaft that controls the position or setting of a valve or regulator, to prevent any unauthorized personnel from changing the setting of the rotatable shaft due to a lack of knowledge as to why the shaft is set at a particular position, to prevent inadvertent rotation of the shaft to a new setting, or to prevent malicious resetting of the shaft to thereby change the flow of energy through the valve or regulator. In one embodiment, the lockout device includes a handle that may be attached to a drive stem of a variety of various manufacturers' valves, regulators, etc., a gear or sprocket fixedly mounted on the drive stem within the handle body and a key lock mechanism selectably positioned in the handle body to engage or disengage the gear and thereby prevent rotational movement of the gear and the rotatable shaft in either direction from the selected setting.

In another embodiment, the lockout device includes a gear that has specially shaped indentations between adjacent teeth so as to form a ratchet gear that is engageable by the key lock mechanism or, alternatively, a spring-actuated pivotable pawl, or spring-biased ball, that will allow the handle and the rotatable shaft to be operated in either the clockwise or counterclockwise direction, but not both. This permits the lockout device, when in the locked position, to allow the shaft to be rotated only in one direction, such as to close the energy control device, but not to open it further than the original setting.

In another embodiment of the lockout device, there is additionally provided a safety or personal lockout device comprising a cap which may be locked in position on the handle through the use of one or more second key lock mechanisms such that the cap overlies the first lockout device whereby the safety lockout device has exclusive control of the position of the energy control device.

Additional embodiments of a safety lockout device include a cap which may be locked in position on the handle so as to prevent access to the first key lock mechanism through the use of a scissors-like bail which may be locked when in a closed position by one or more ordinary padlocks wherein the padlock key provides exclusive personal control over access to the first key lock mechanism.

A primary object of the present invention is to provide a simple, low-cost, highly reliable, compact, lockout device for use on a wide variety of rotatable shaft control devices, such as valves, regulators and the like.

Another object of the present invention is to provide a lockout device which when in the locked position will still allow the rotatable shaft to be rotated in one direction only, such as to close the setting of the shaft of the control device but not to allow opening of the control device.

Still another advantage of the present invention is to provide a lockout device that complies with the Occupational Safety and Health Administration requirements for plant safety.

Still one more object of the present invention is to provide a lockout device having two lockout mechanisms; the first mechanism being in the control of plant personnel responsible for the operation of the process including the setting of various valves, regulators, and other energy-controlling devices having a rotatable shaft wherein the operations lockout device includes a key lock mechanism with a key (or combination) available only to operations authorized personnel to permit such personnel to manually set the position of a rotatable shaft so as to control the amount of energy passing through a device; and a second, safety lockout device that is under the exclusive control of a service or maintenance person and which overrides the operations lockout device so as to prevent any inadvertent release of energy while the service person is working on the equipment.

One more object of the present invention is to provide a lockout device that is equally usable on a wide range of different manufacturers' valves, regulators, or other energy control devices so that within a single industrial facility, although valves and regulators from different manufacturers are used, a single type of lockout device may be employed, thus conforming with one of the requirements of the OSHA regulations, and also facilitating the proper use of such lockout devices by authorized personnel.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating these preferred embodiments of the invention and are not to be construed as limiting the invention. In the drawings:

FIGS. 24A and 24B are plan views of a fourth variation of a personal lockout device shown in FIG. 24A in the unlocked position, and in FIG. 24B in the locked position;

FIGS. 25A and 25B are side views of the fourth variation of the safety lockout device of FIGS. 24A and 24B;

FIGS. 28A and 28B are plan views of a fifth variation of a safety lockout device, FIG. 28A showing the device in the unlocked position, and FIG. 28B showing the device in the position for lockout;

FIGS. 29A and 29B are side views of the fifth variation of the safety lockout device shown in FIGS. 28A and 28B.

DESCRIPTION OF THE PREFERRED EMBODIMENTS

Figure 1:
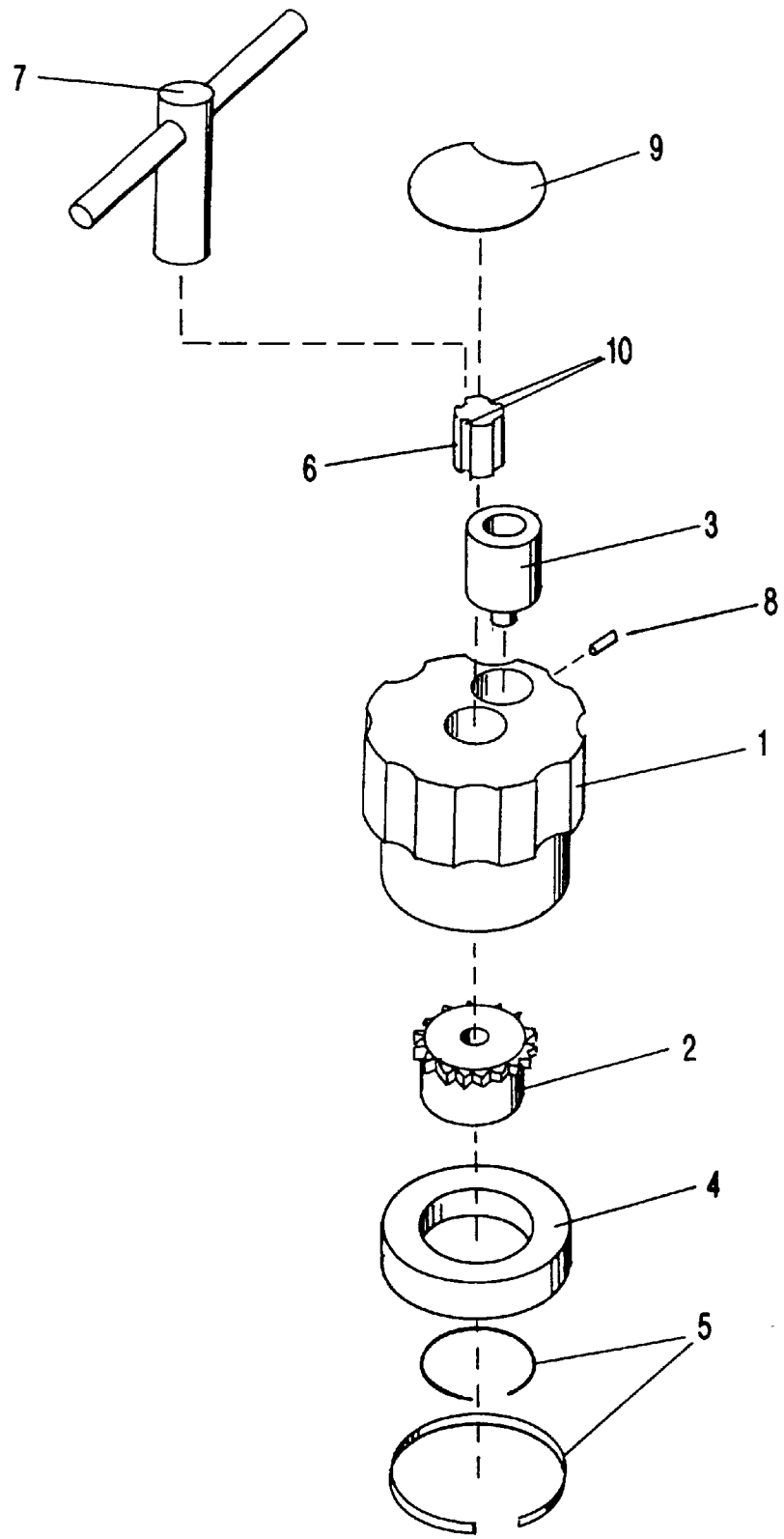
FIG. 1 is an exploded perspective view of a first embodiment of the invention.
Figure 2:
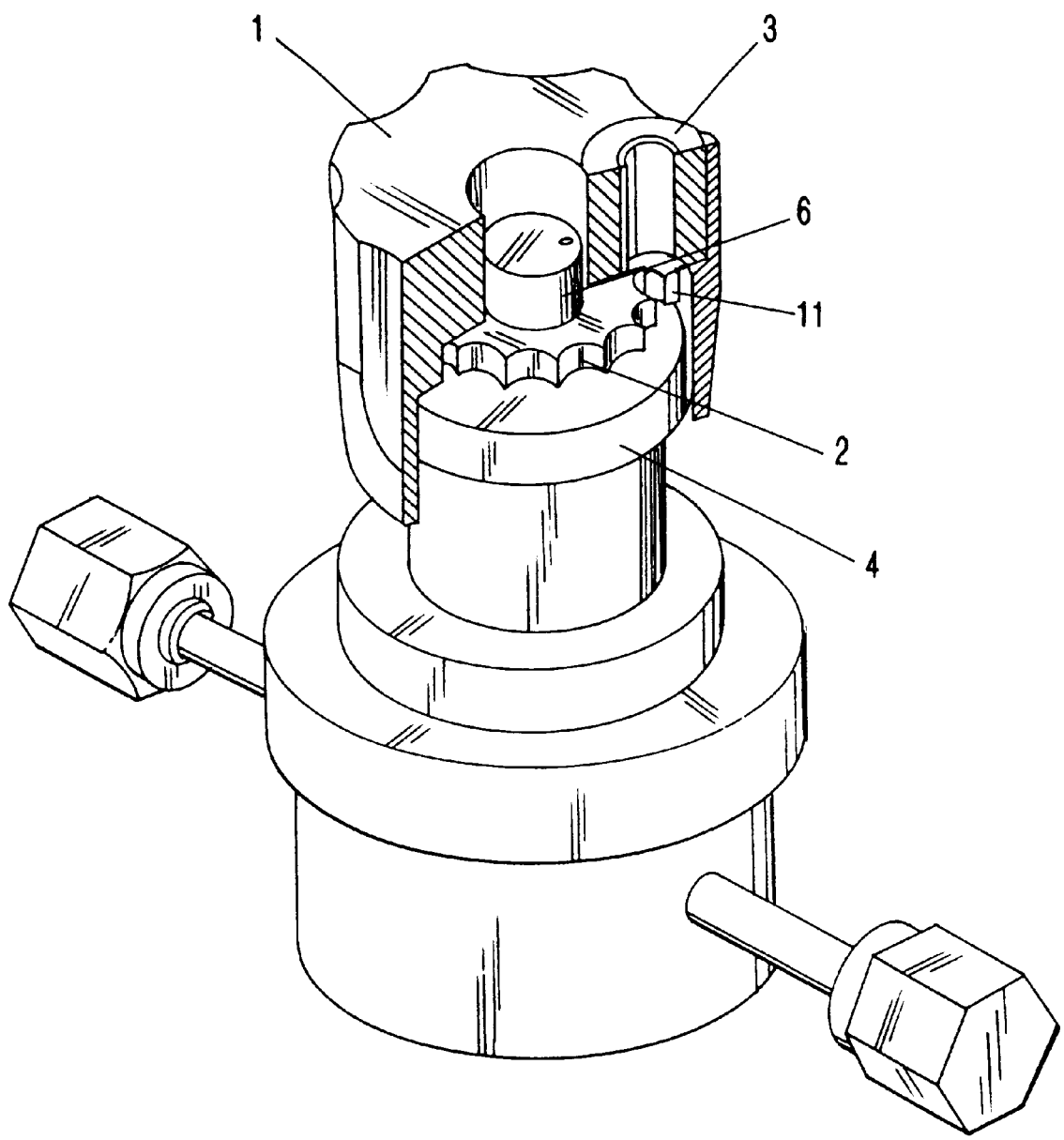
FIG. 2 is a cut-away perspective view of the embodiment of FIG. 1 shown mounted on a valve.

This invention relates primarily to lockout devices, particularly lockout devices designed to prevent accidental, ignorant, or malicious adjustment of the setting of a shaft in an industrial facility that controls the amount of energy passing through an energy control apparatus such as a valve, regulator, or the like.

The first embodiment of the invention is illustrated in FIGS. 1 through 6 and comprises a lockout device which prevents rotation of a handle against movement in either direction. The invention comprises a main handle body I constructed from machined or cast metal such as aluminum, or formed by injection molding of plastic. The handle body contains a gear or sprocket 2, that is positioned within a cylindrical cavity or opening in the lower end of the handle. The gear may be made of plastic or metal, and is rotatably supported within the lower cylindrical opening by means, such as a bearing 4, which is held in place by retaining rings 5. Bearing 4 allows the handle body 1 to free-wheel when the lockout device is in a locked condition as described below. In accordance with an object of the invention, it is desirable to provide a lockout device for a handle that can be used on a wide variety of valves, regulators, or other energy controlling apparatus from different manufacturers. Accordingly, the engagement means, such as gear 2, as seen best in FIGS. 4 and 5, has an opening 2a and the handle has a central bore for receiving and engaging the drive stem, i.e., the rotatable shaft of a control apparatus such as a valve or regulator.

Figure 3:
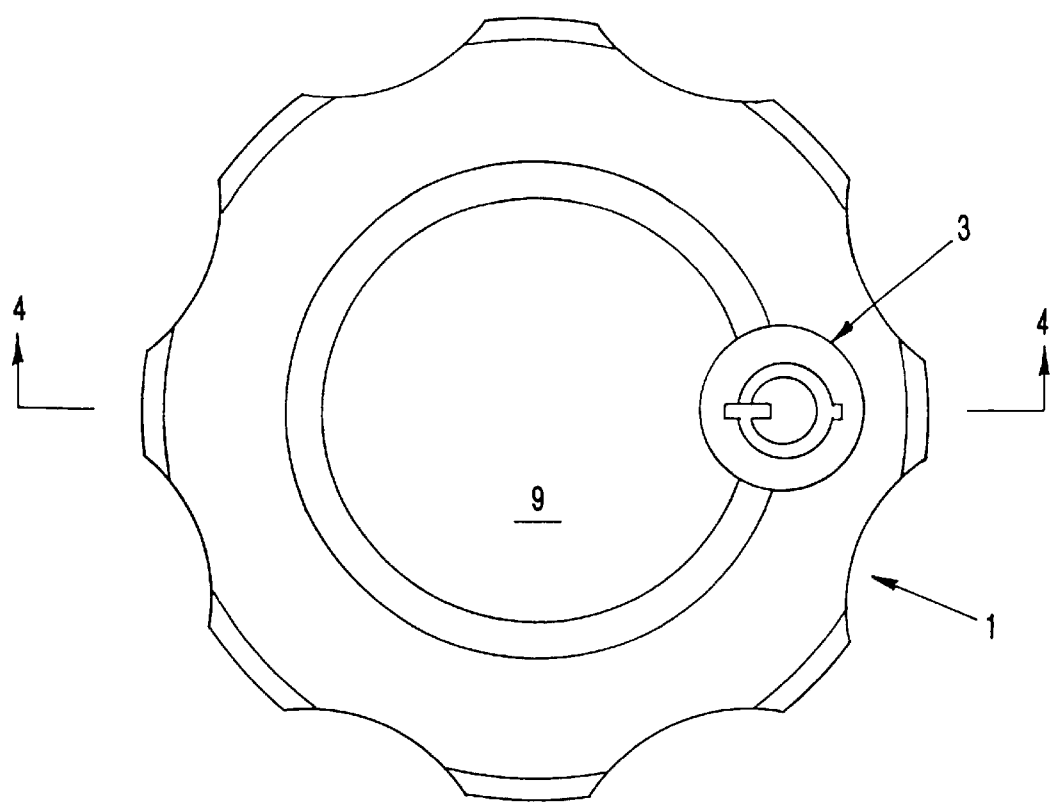
FIG. 3 is a top view of the first embodiment shown in FIG. 1.

A key locking mechanism 3 is mounted in a cylindrical opening in the upper end of handle 1, offset from the axis of the handle as seen best in FIG. 3. The key locking mechanism 3 is of an off-the-shelf construction with various key types or may be a combination lock and includes a locking dog 11 (as seen best in FIG. 2). The key locking mechanism 3 is secured within the handle body 1 by a locking mechanism retaining pin 8 (see FIG. 4). In this type of off-the-shelf locking mechanism, a key is adapted to be inserted into the locking mechanism when the center body of the mechanism has its singular notch aligned with one of the two notches in the locking mechanism's outer body which are positioned at 180° apart. When the proper key is inserted, the center body may be rotated 180° and the key may then be withdrawn.

Figure 4:
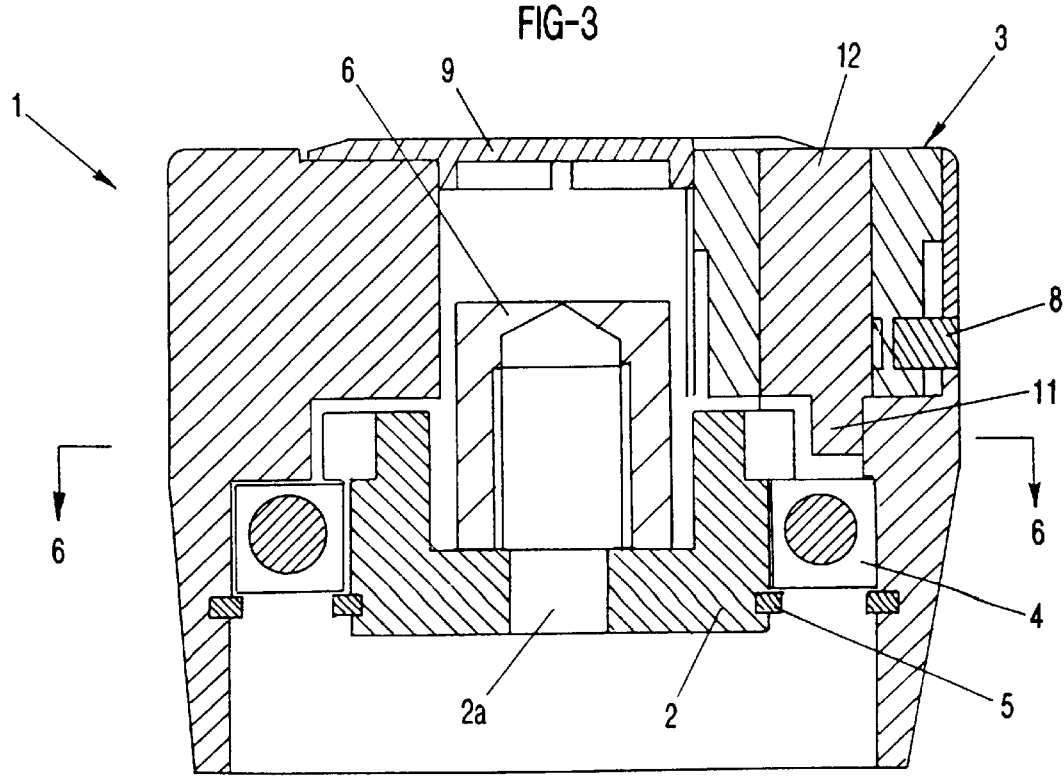
FIG. 4 is a sectional view taken along the line 4—4 on FIG. 3.
Figure 5:
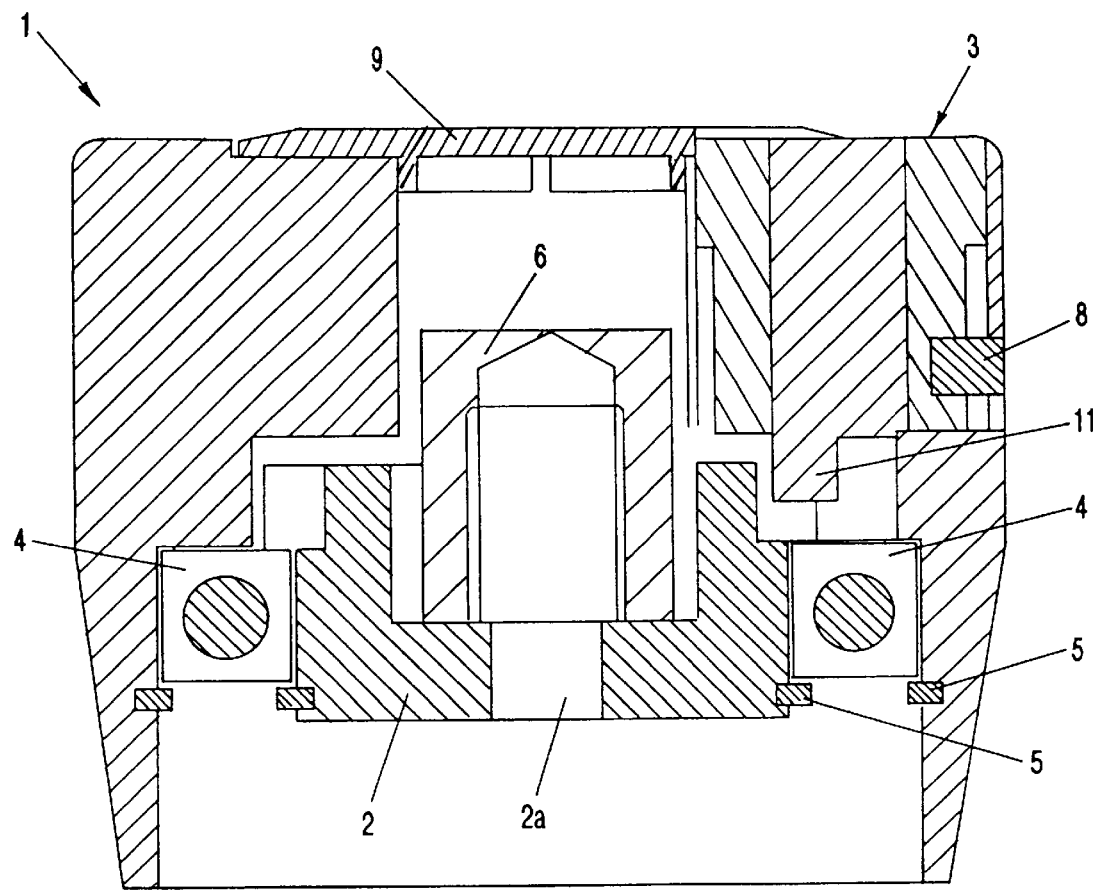
FIG. 5 is a sectional view as in FIG. 4 except showing the lockout device in a locked position.
Figure 6A:
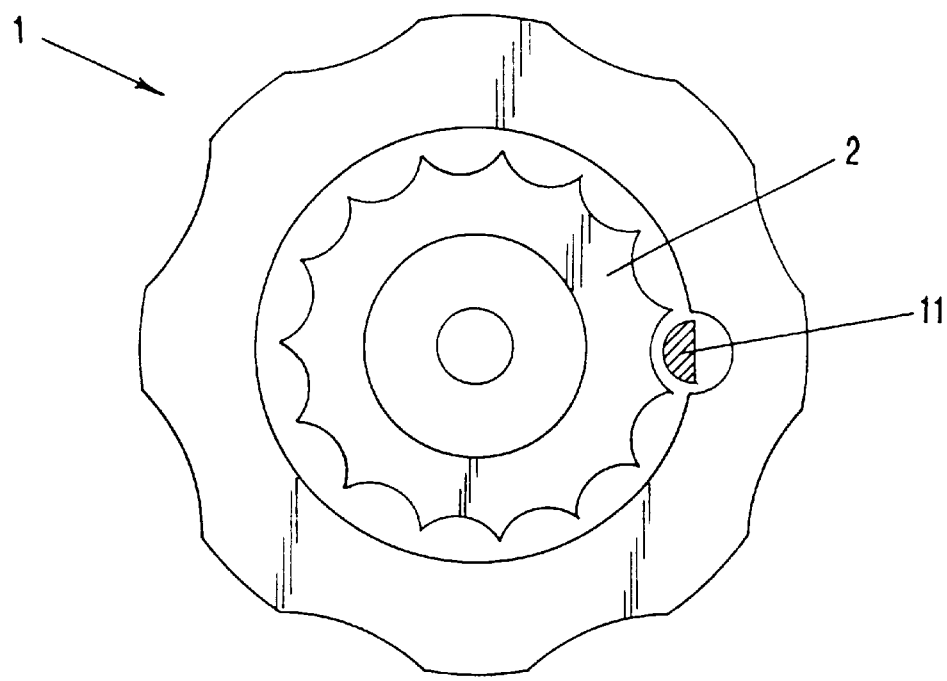
FIGS. 6A and 6B are sectional views taken along the line 6—6 of FIG. 4 and showing the lockout device in the engaged position in FIG. 6A and in the disengaged position in FIG. 6B.
Figure 6B:
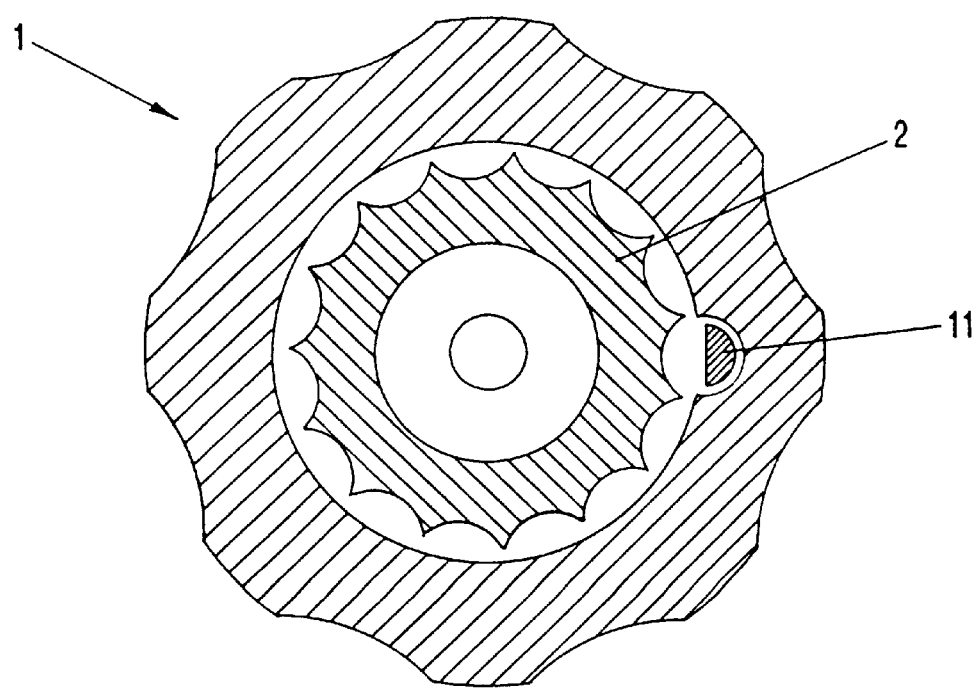

According to this first embodiment, the setting or position of the shaft or drive stem may be manually set by inserting the key into the key locking mechanism 3, rotating the key so that the dog 11 engages the opening between adjacent teeth on the gear or sprocket 2 as seen in FIGS. 6 and 6A which then mechanically couples the handle 1 to the valve stem through the gear 2 and the dog 11. In this position, the handle may be rotated in either direction and the drive stem of the valve will be commensurately rotated so as to open or close the valve thus regulating the flow of energy through the valve. When the correct position of the valve is determined, such as by manually or automatically determining the flow of energy through the valve, in accordance with the specification of the process being controlled by the valve, the key in the key locking mechanism 3 is rotated so as to disengage the locking dog 11 from the gear or sprocket 2 as seen in FIGS. 4 and 6B and the key may then be removed. In this condition, the handle 1 will then free-wheel on the drive stem rotatable shaft preventing any change in the setting of the rotatable shaft and therefore controlling the energy passing through the control device.

To prevent an unauthorized person from removing the entire handle body from the drive stem, whereby the drive stem could then be rotated with another handle or a pair of pliers, the handle body 1 is secured to the valve rotatable shaft that is positioned within the opening 2a in the gear and extends into the bore through the use of a jam nut 6 within the handle central bore that includes a spanner wrench hole pattern 10 that matches that of an installation tool 7. To prevent the use of any common spanner wrench from being used to disengage the jam nut 6, the lockout device may be specified with the hole pattern 10 so that only a matching installation tool will be useable. A plastic handle cap 9 may be employed to cover the jam nut 6 so as to frustrate unauthorized personnel from obtaining access to the jam nut and to also evidence tampering if authorized plant personnel observe that the cap has been removed.

Figure 7:
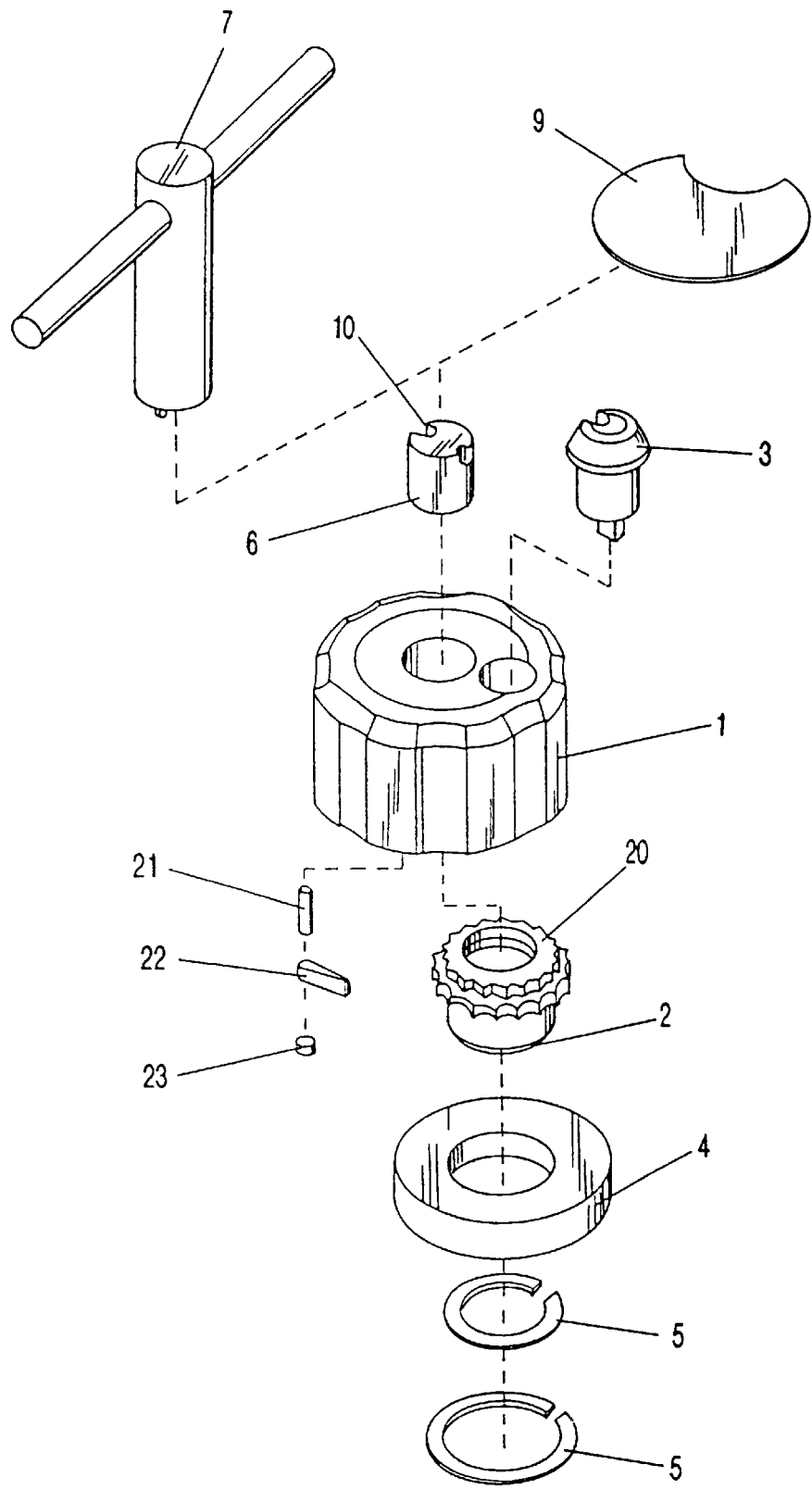
FIG. 7 is an exploded view of a second embodiment of the lockout device.
Figure 8:
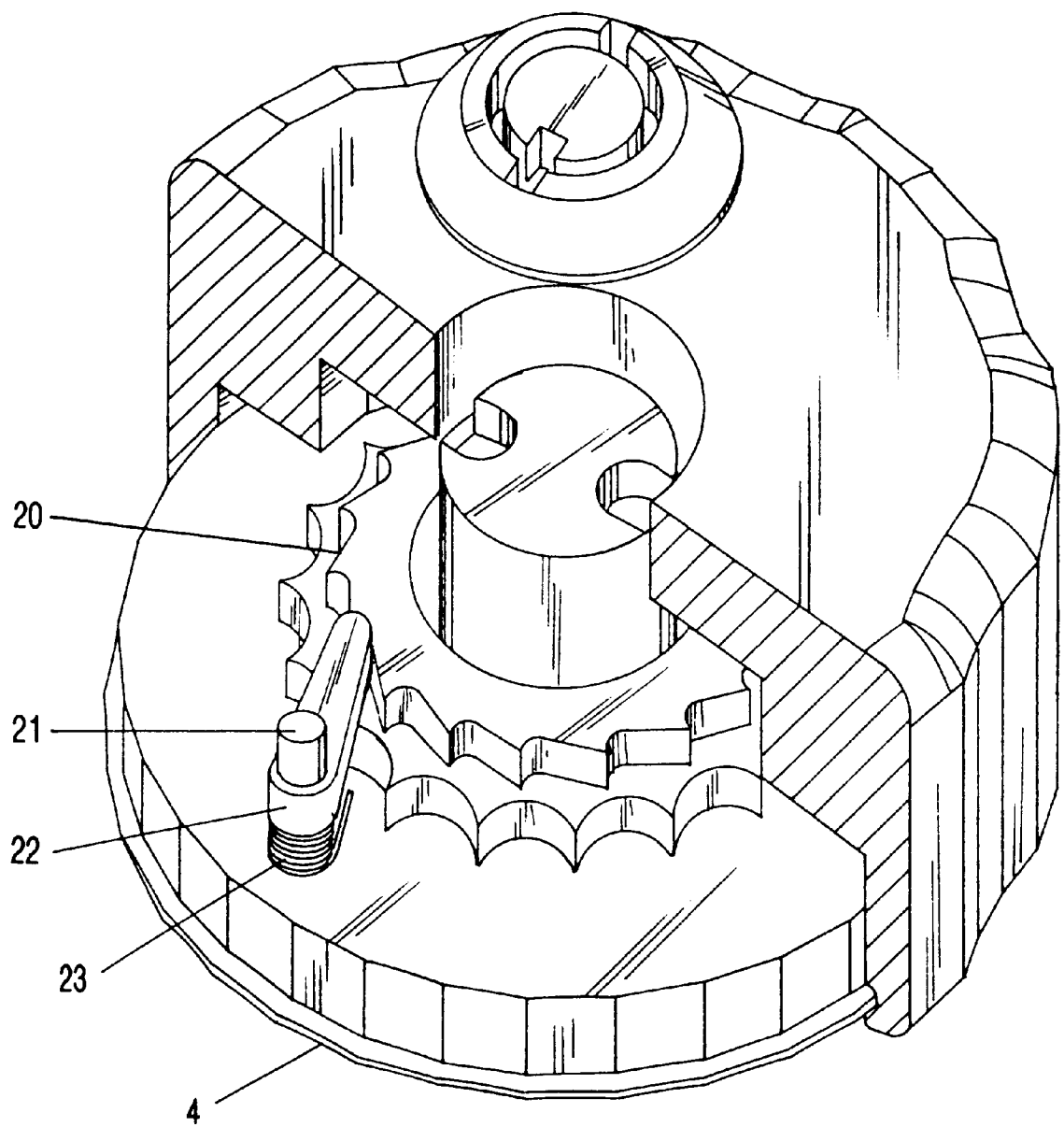
FIG. 8 is a cutaway perspective view of the second embodiment shown in FIG. 7.

A second embodiment of the invention is shown in FIGS. 7 through 11. The principal difference between the embodiment shown in FIGS. 7 and 8 is the provision of a ratchet wheel 20 which is fixedly mounted to the gear or sprocket 2 and rotates therewith. A pawl comprising an arm 22 on a shaft 21 is carried in the cylindrical opening in the lower end of handle 1 and is biased by spring 23 in engagement with the ratchet wheel 20.

In this second embodiment, when the key locking mechanism 3 is in the lockout position, i.e., the locking dog 11 is disengaged from the opening between the teeth on the gear 2 the handle is free to free-wheel, but in only one direction. In use, as seen best in FIG. 8, when the housing body 1 is rotated in the clockwise direction (viewed from above) the pawl arm 22 slips over the ratchet wheel 20 in conventional manner and allows the handle 1 to free-wheel in the clockwise direction. Conversely, if the handle 1 is rotated in the counterclockwise direction, the pawl arm 22 engages the ratchet wheel 20 and therefore the handle 1 will be rotatably fixed to the shaft of the control device (in a single direction only) allowing the shaft rotational position to be reset. In application, the direction of the engagement/disengagement of the pawl and ratchet depends on whether it is desirable to allow the setting of the control device to be altered in a clockwise or counterclockwise direction. For example, it may be desirable to allow any personnel, whether or not authorized, in the case of an emergency, to close a valve or other energy-controlling device without the necessity for a key but under no circumstances to allow the valve setting to be changed so as to open the valve beyond its original setting.

Figure 9:
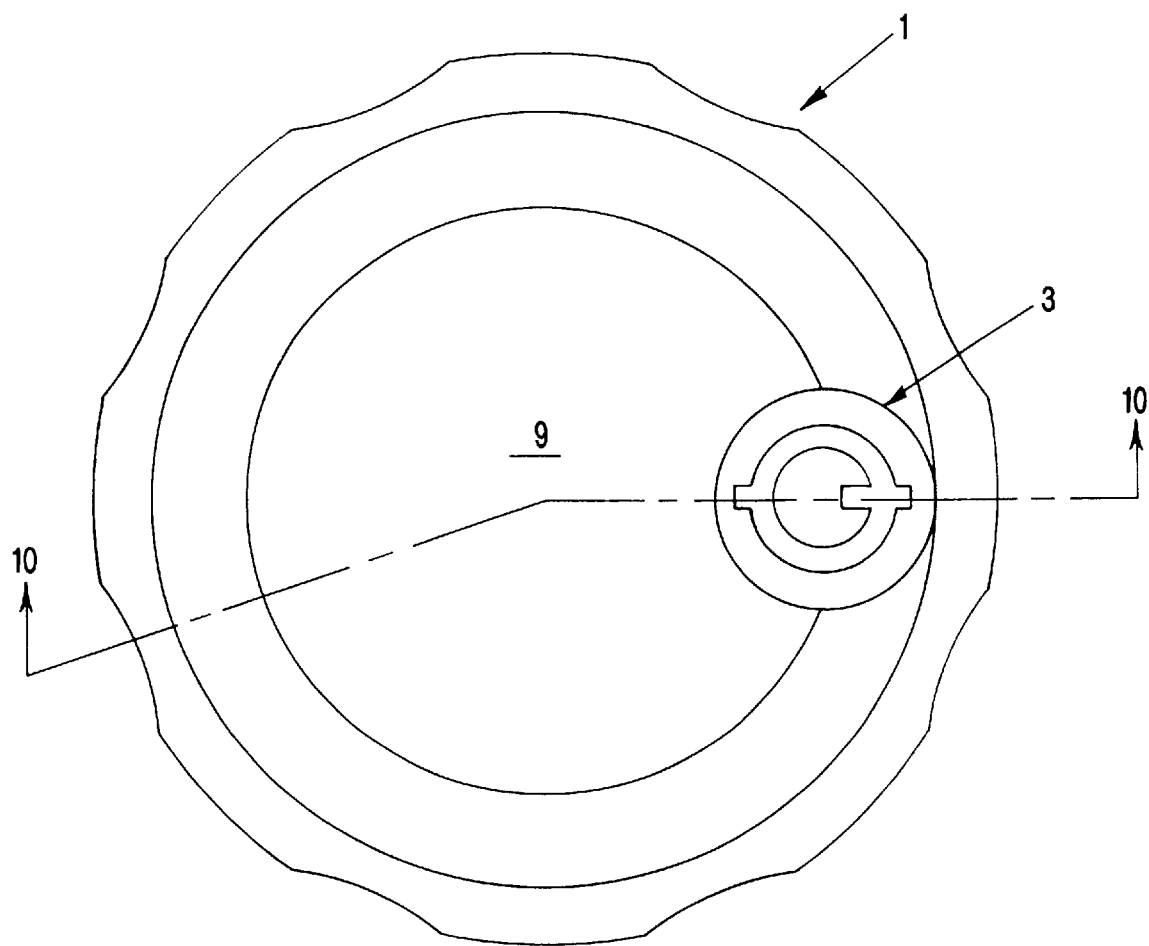
FIG. 9 is a top view of the second embodiment of the lockout device shown in FIGS. 7 and 8.
Figure 10:
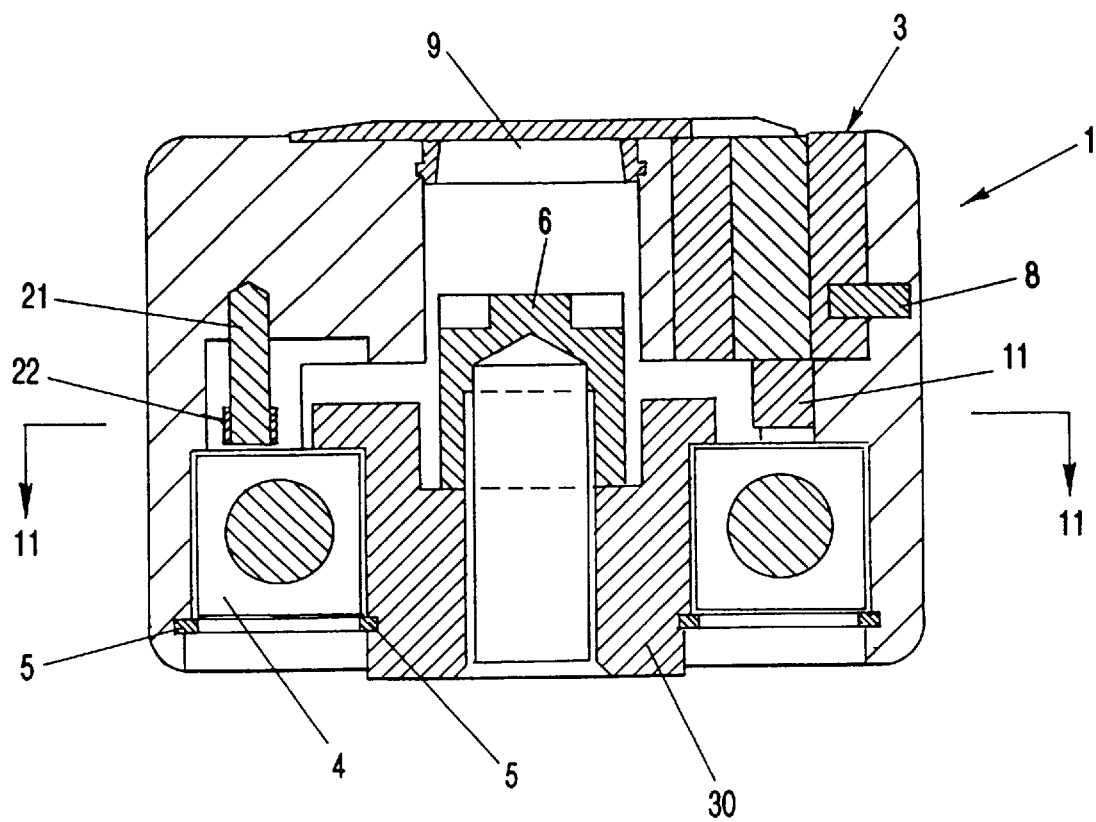
FIG. 10 is a sectional view taken along the line 10—10 in FIG. 9.

FIGS. 9 through 11 show a modified second embodiment in which the ratchet wheel 20 is functionally combined with the gear 2 so as to eliminate one of these parts. As seen best in FIGS. 11A and 11B, a cut-away top view of FIG. 9, the gear/ratchet 30 is engaged by both the dog 11 of the key locking mechanism 3 as well as the pawl arm 22. The ability of the lockout device with the single gear/ratchet 30 to be engaged by the locking dog 11 so that the handle 1 and the valve drive stem, through the gear/ratchet 30, permits adjustment of the rotatable position of the drive stem shaft by manually turning the handle 1 is due to the shape of the opening between adjacent gear/ratchet teeth and the proper placement of the locking dog 11 and the pawl arm 22 in relation to the gear/ratchet 30. The advantage of the replacement of two parts with a single part will be obvious to those having skill in the art.

Figure 11A:
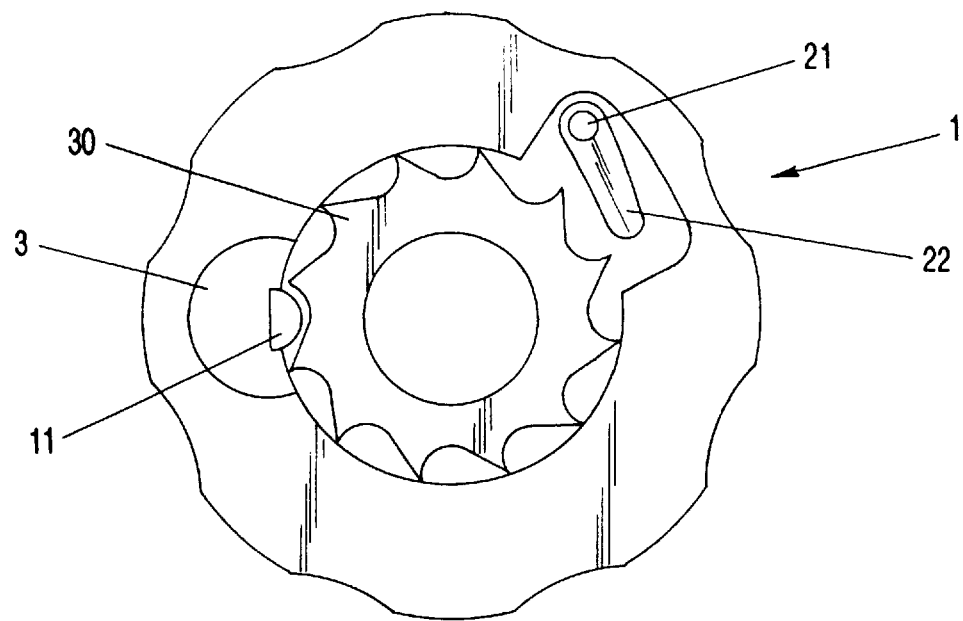
FIGS. 11A and 11B are sectional views taken along the line 11—11 on FIG. 10, showing the lockout device in its second embodiment in the unlocked position in FIG. 11A and in the locked position FIG. 11B.
Figure 11B:
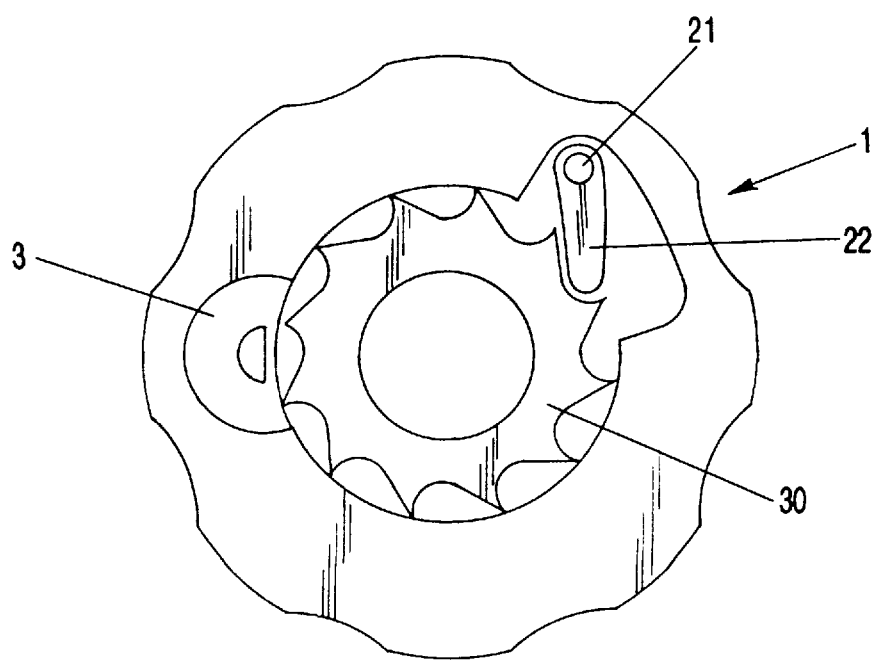
Figure 11C:
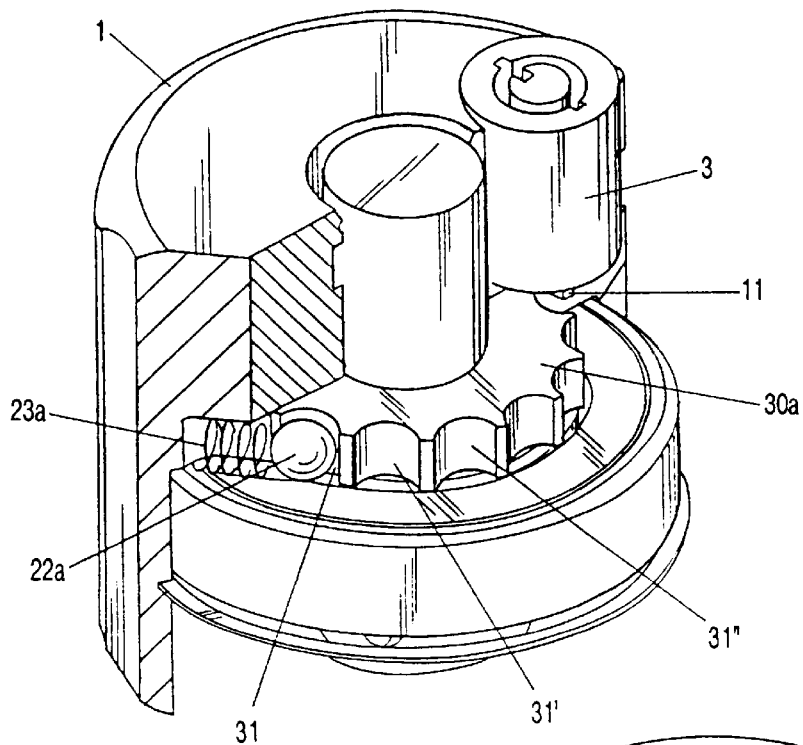
FIG. 11C is a perspective partially sectional view of an alternative embodiment of the embodiment shown in FIG. 11, with a spring-biased ball ratchet.
Figure 11D:
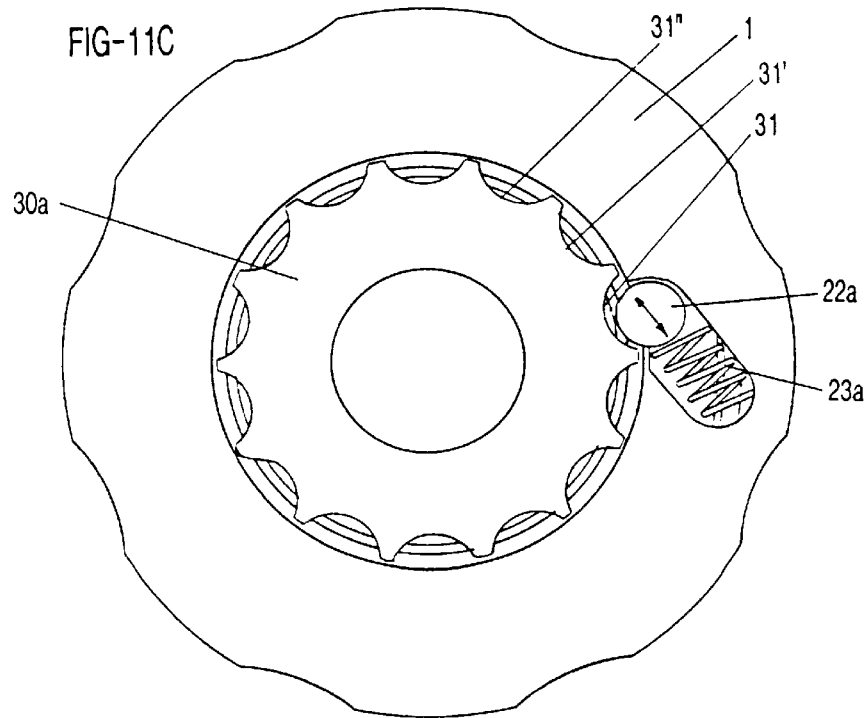
FIG. 11D is a plan sectional view of the embodiment of FIG. 11C.

FIGS. 11C and 11D illustrate still another version of the second embodiment incorporating an alternative ratchet mechanism for providing a "unidirectional" lock-out whereby the stem can be turned one direction only without the use of a key. This embodiment is substantially similar in most respects to the embodiment of FIGS. 11, 11A, and 11B, and functions similarly except that a spring-biased movable ball 22a is employed in lieu of a pivotable pawl 22. Like the embodiment of FIGS. 11A and 11B, there is provided a ratchet 30a wholly integrated with the gear 2. As seen in FIGS. 11C and 11D ratchet 30a is engaged by both the dog 11 of the key locking mechanism 3 as well as the ball 22a. The engageability of the gear/ratchet 30a with the locking dog 11 so that the handle 1 and the valve drive stem, through the gear/ratchet 30a, permits adjustment of the rotatable position of the drive stem shaft by manually turning the handle 1, is due to the shape of the opening between adjacent gear/ratchet teeth and the proper placement of the locking dog 11 and the ball 22a in relation to the gear/ratchet 30a.

The ratchet 30a has a plurality of notches 31, 31', 31" disposed uniformly and circumferentially thereabout. Ball 22a, very preferably a sphere of uniform radius, is movably disposed on the handle body 1, for example by moving to-and-fro within an aperture or tunnel therein. A coil spring 23a serves to bias the ball 22a toward the ratchet 30a, so that when the handle housing is not coupled to the ratchet 30a by means of the interposition of the dog 11 between any two adjacent notches on the ratchet 30a, the ball 22a moves into selective engagement with a corresponding one 31 of the notches 31, 31', 31" to prevent the handle 1 from rotating in one direction. The notches 31, 31', 31" preferably define arcs comprising radii substantially equal to said radius of the ball 22a to provide for secure engagement of the ball with any one notch. As best shown by the bidirectional arrow in FIG. 11D, the ball 22a is movable along an imaginary line skewed in relation to the axis of the handle 1 and thus to the rotatable shaft. Providing a skewed positional relationship, whereby the ball 22a is translatable along an imaginary line generally tangential to the wheel of the ratchet 30a, provides for a smooth rotation of the handle 1 in the "safe" direction (i.e. counterclockwise in FIG. 11D, since the relative (clockwise) rotary motion of the ratchet 30a will simply push the ball back against the bias of the spring 23a, allowing the teeth of the ratchet to pass. Any attempt to rotate the handle in the "unsafe" direction, however, immediately binds the ball 22a between the ratchet 30a and the handle 1, thus preventing further relative movement of the handle with regard to the ratchet wheel 30a. It is immediately appreciated by one of ordinary skill in the art that this ratchet modification incorporating a ball 22a and spring 23a may be readily adapted for use in the embodiment of FIGS. 7 and 8, as well, where ratchet wheel 30 is distinct from but fixedly secured to the gear or sprocket 2.

In the third and fourth embodiments shown in FIGS. 12 through 16, a second "personal" or "safety" lockout device is employed in addition to the lockout device previously described. The purpose is to provide a higher level of safety, through the exclusive control of a single key by a service or maintenance personnel, so as to comply with OSHA requirements. In application, the lockout device as shown in the first or second embodiments, may be used by operations personnel to set the shaft on an energy-controlling device to a specific position that determines the amount of energy passing through the control device. While the configuration of the invention as shown in the first and second embodiments serves a safety purpose, it is also used to set a process control parameter that is necessary for proper operation of a system. The manual setting of the position of the shaft and therefore the amount of energy passing through the control device may be desirably set by various authorized personnel within an industrial plant, or any other similar setting, such as a process control engineer, a process control supervisor, or some other person with the authority to set the process control parameter. Since there are likely several such authorized personnel, there may be multiple keys available for these authorized personnel to use to set or reset the position of the shaft of the control device.

In the third and fourth embodiments, in addition to the operations lockout device, there is provided a second lockout device to which there is only a single key that is issued to a service or maintenance person who will perform repair operations on the system or equipment. Since that person while engaged in repairing a system may be vulnerable to an inadvertent, or ignorant change in a valve setting that could cause serious bodily harm, it is desirable to exclude all persons other than the service or maintenance person from changing the valve position. This second, safety lockout device therefore overrides the operations lockout device as will be seen and described with reference to FIGS. 12 through 16.

Figure 12:
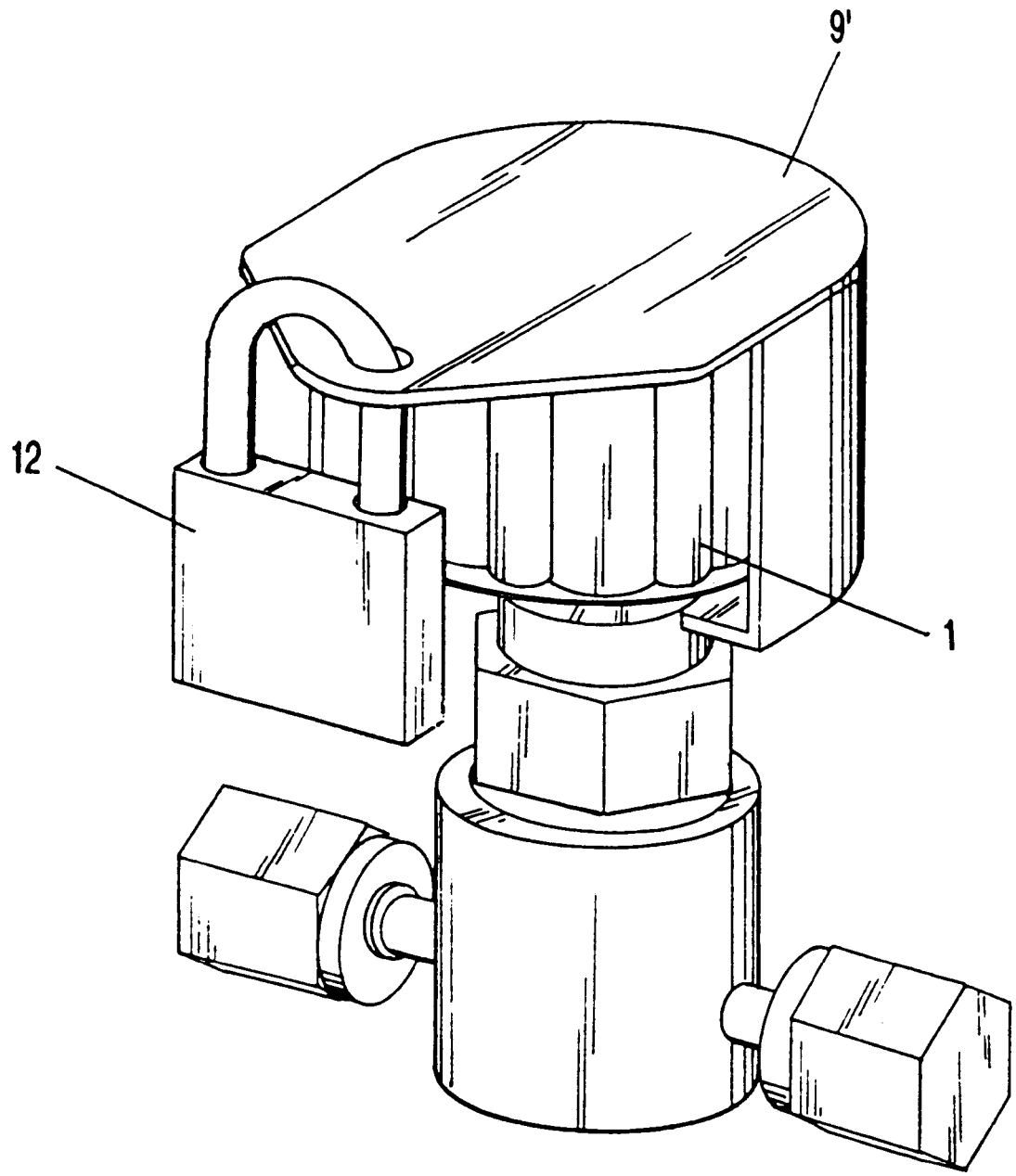
FIG. 12 is a perspective view of a third embodiment of the lockout device showing a first variation of a safety or personal lockout device.
Figure 13:
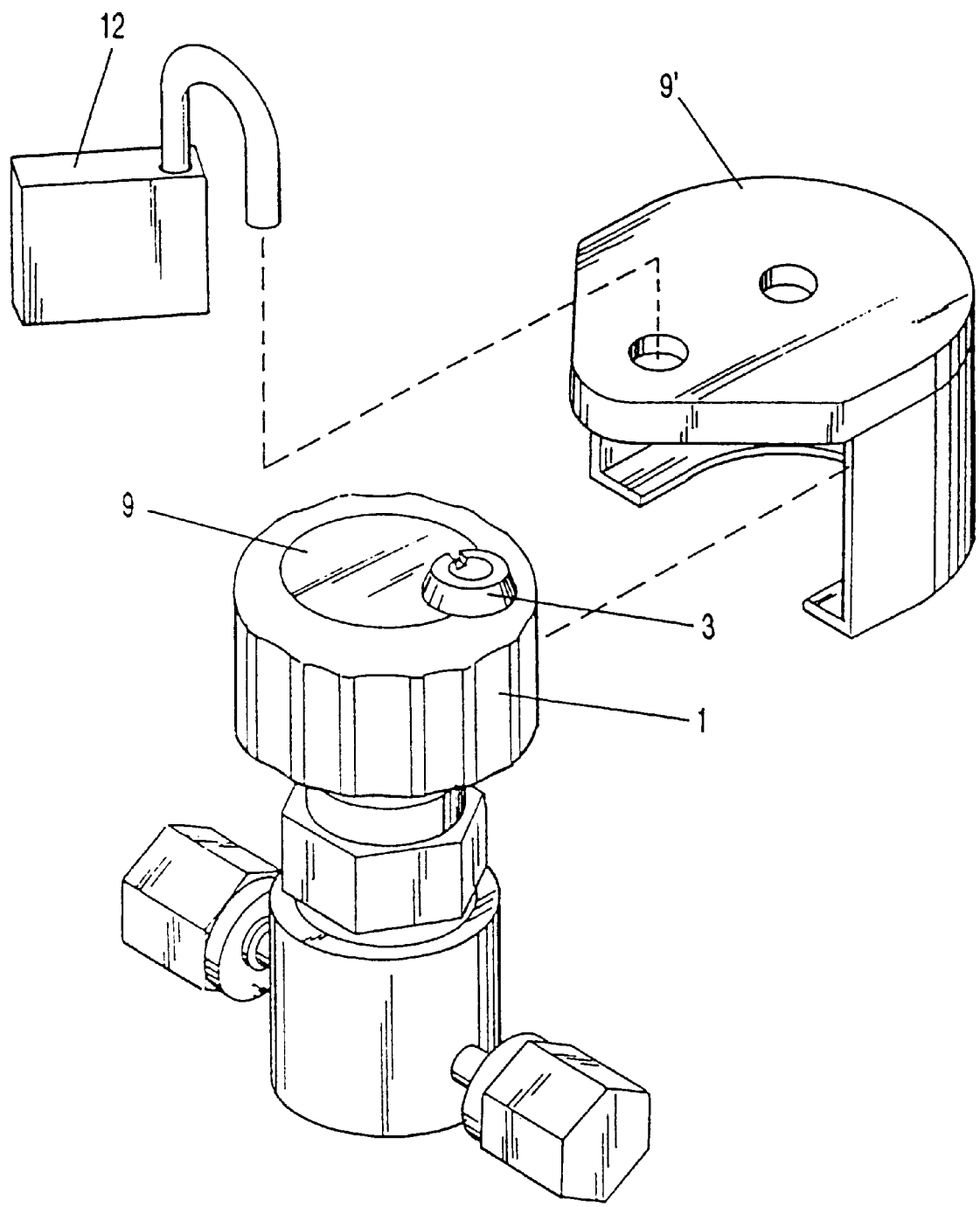
FIG. 13 is a disassembled exploded view of the third embodiment of the lockout device shown in FIG. 12.

In FIGS. 12 and 13 there is shown a first variation of a safety lockout device comprising an enclosure 9 which is of generally U-shaped construction having an upper wall, a lower wall with a U-shaped opening and of a size and configuration so as to fit over the handle body 1 as seen best in FIG. 12. It will be noted that the key locking mechanism 3 of the operations lockout device, when the enclosure 9 is in place as shown in FIG. 12, is entirely covered, thus denying access to the operations key locking mechanism 3. By inserting the padlock 12 through the opening at the outer edge of the enclosure 9, which acts like a hasp, when the padlock 12 is closed, only the person with the key to the padlock 12 will have access to the lockout device including the key locking mechanism 3 and therefore control of the valve setting. Thus, in accordance with OSHA requirements, the holder of the key to the padlock 12 has exclusive control over setting of the control device which effectively overrides the operations lockout device key locking mechanism 3 that is controllable by operations personnel. If a service or maintenance person has the exclusive control of the key to the padlock 12, there is no chance for any other person at the facility, including any operations personnel, from altering the setting of the control device during maintenance operations.

Figure 14:
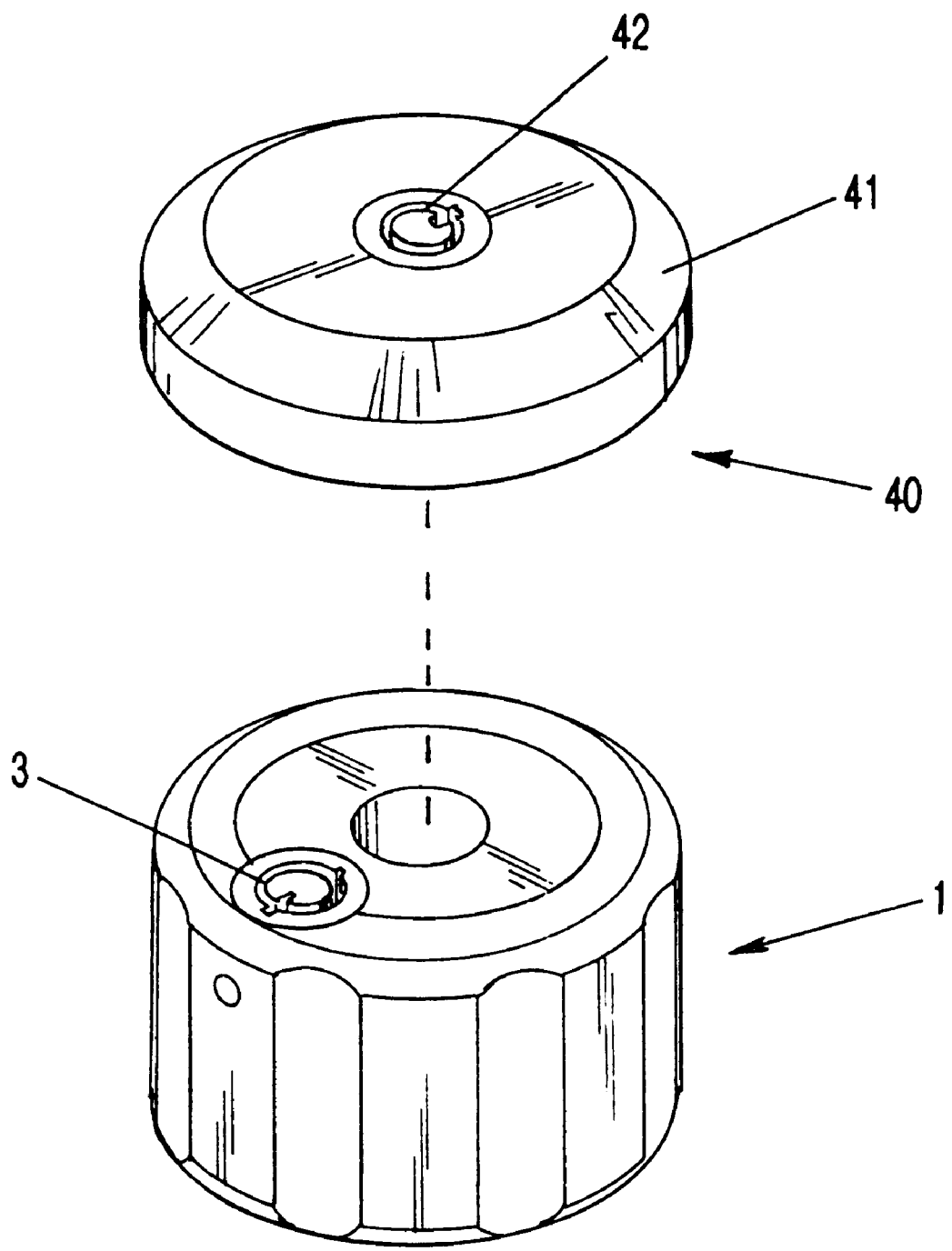
FIG. 14 is a partial exploded view of a fourth embodiment of a lockout device showing a second variation of a safety or personal lockout device.
Figure 15:
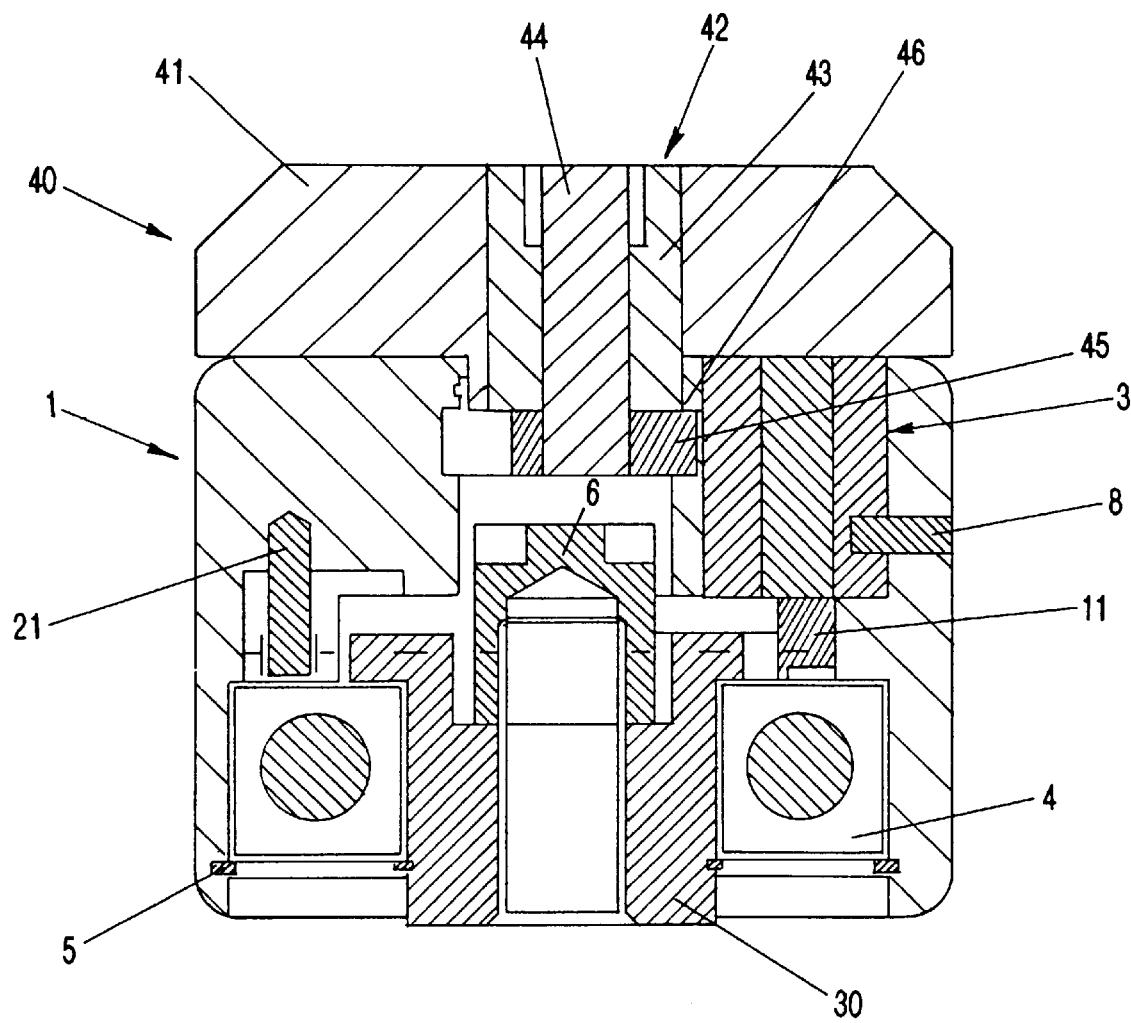
FIG. 15 is a sectional view of the fourth embodiment shown in FIG. 14 with the personal lockout device in place.
Figure 16:
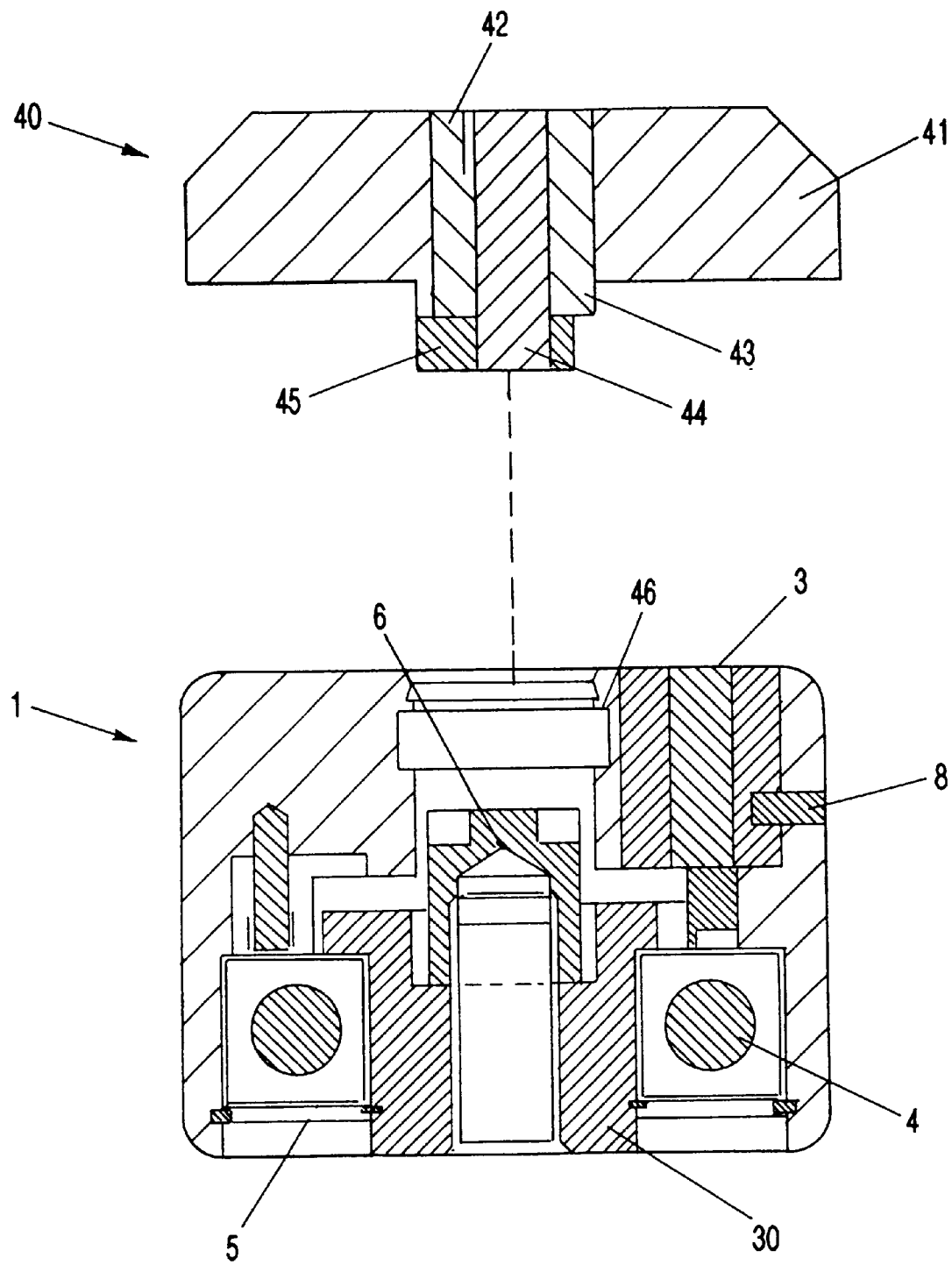
FIG. 16 is a view as in FIG. 15 except showing the personal lockout device disassembled.

In FIGS. 14 through 16 there is shown a fourth embodiment of a lockout device showing a second variation of a personal or safety lockout device 40. The safety lockout device key mechanism 40 comprises a cap body 41 and a key locking mechanism 42 which may of the same type as key locking mechanism 3, but operable only with a different key for the reasons outlined above. As seen best in FIGS. 15 and 16, the key locking mechanism 42 includes an outer body 43, a central body 44, and a locking tab 45 which engages a shoulder 36 formed in a central bore of the handle body 1. When desired, the personal safety lockout device 40 may be employed by placing the cap 41 over the top of the handle body I whereby the cap prevents access to the operations key locking mechanism 3. By rotating the central body 44 through the use of a key, the cap 41 may be locked in place when the locking tab 45 engages the shoulder 36 of the handle 1 as seen best in FIG. 15.

Figure 17:
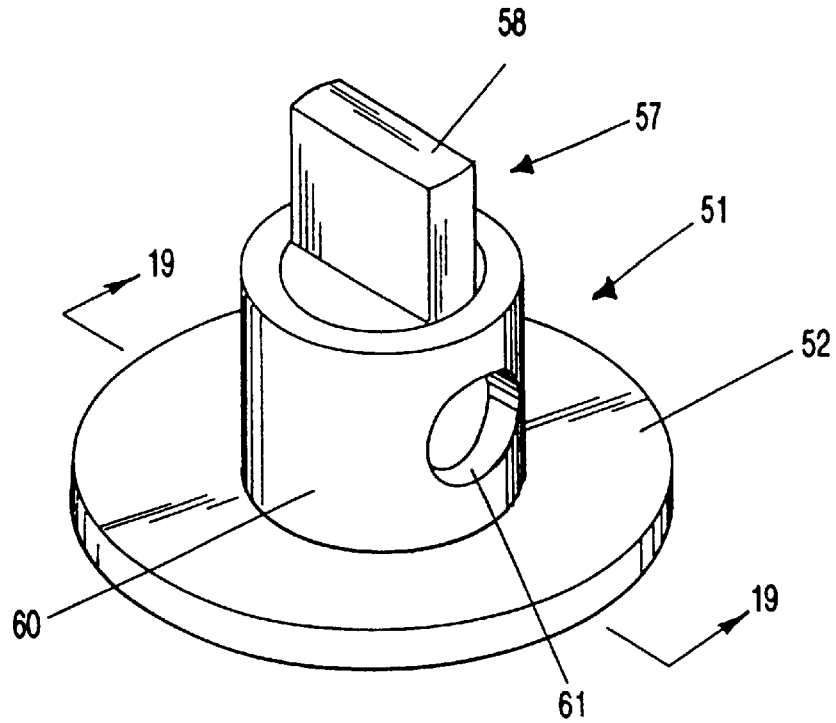
FIG. 17 is a third variation of the personal or safety lockout device shown in perspective.
Figure 18:
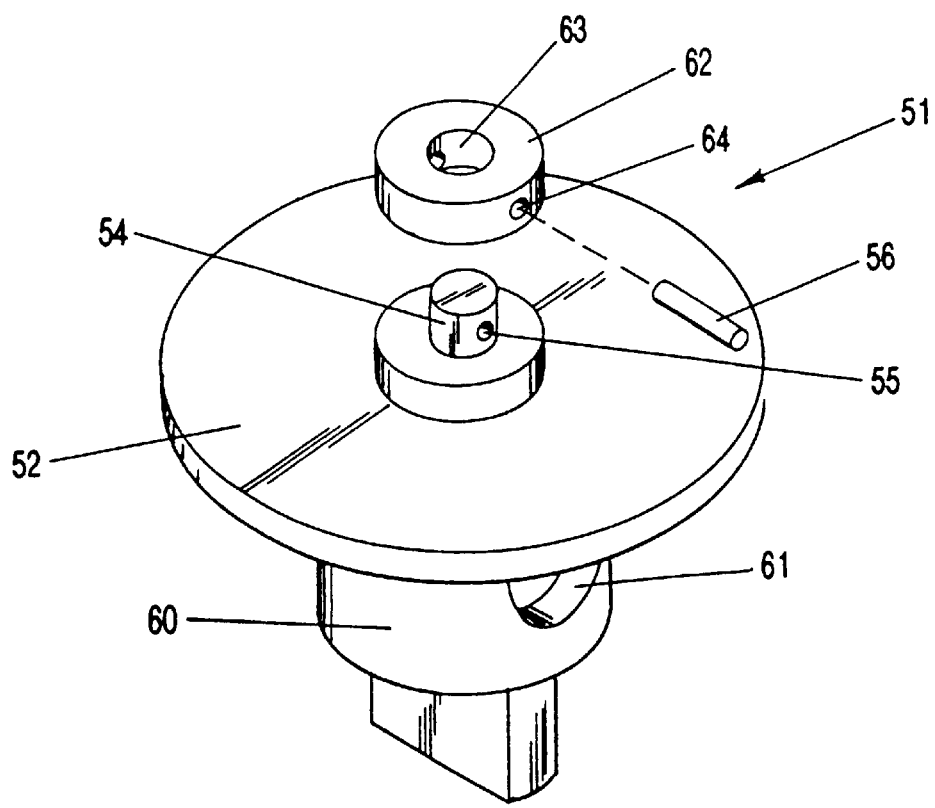
FIG. 18 is a perspective view of the third variation of the safety lockout device shown in FIG. 17 in the inverted position.
Figure 19:
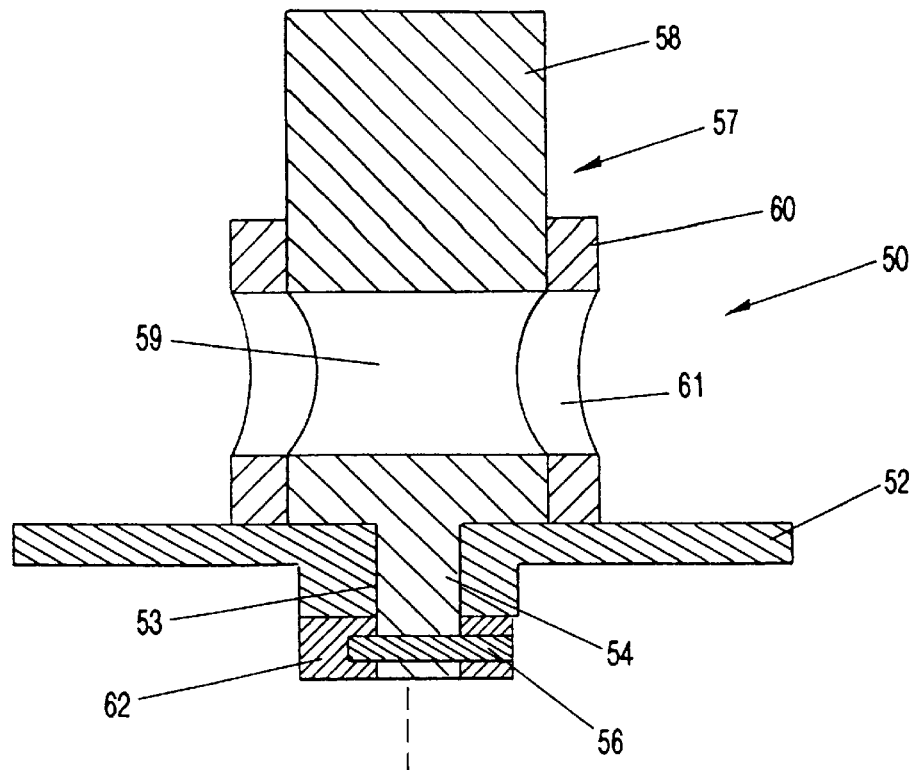
FIG. 19 is a sectional view along the line 19—19 in FIG. 17.
Figure 20:
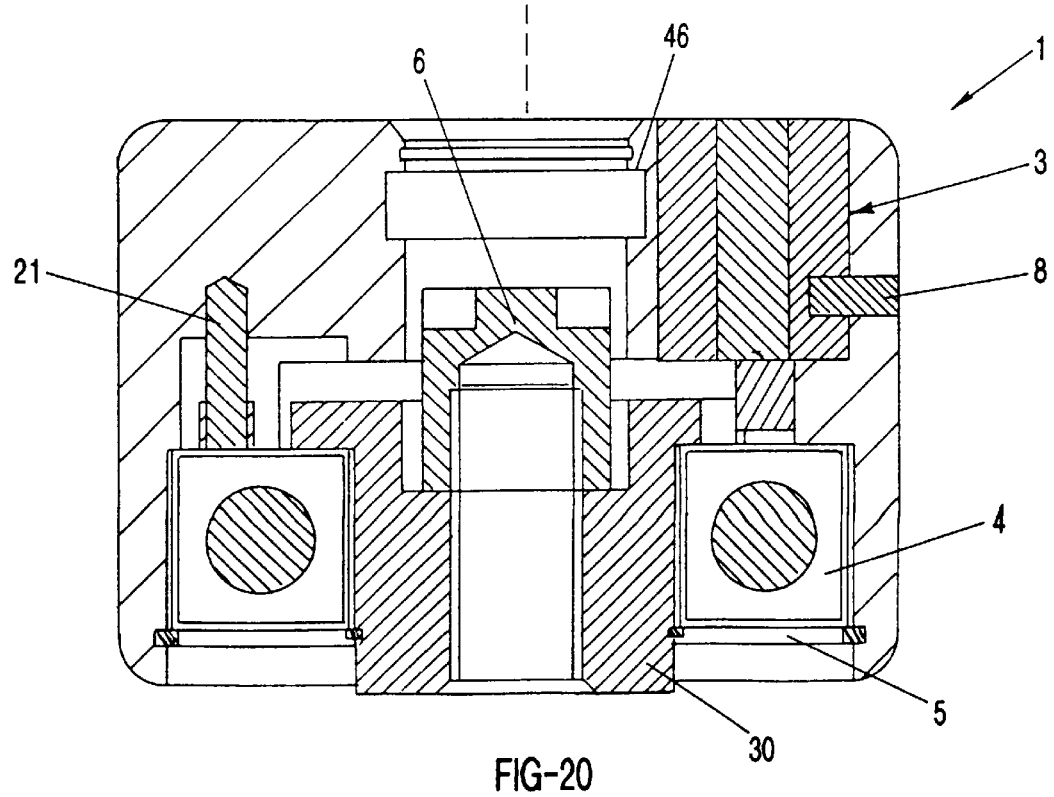
FIG. 20 is a sectional view of the handle of the second embodiment locking device as shown in FIG. 10 with minor modification.
Figure 21:
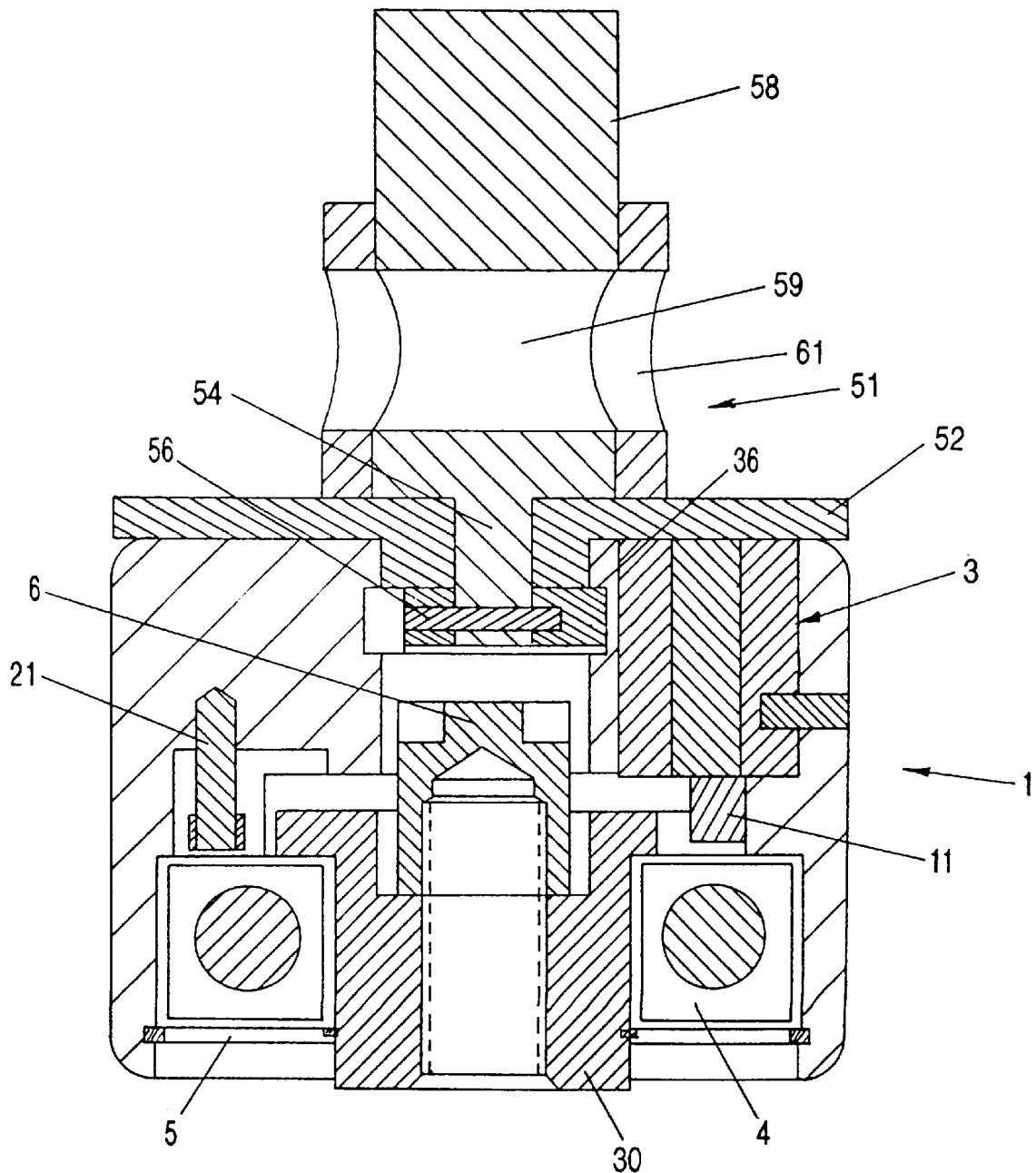
FIG. 21 is an assembled view in full section of the third variation of the safety lockout device shown in a locked position on the handle shown in FIG. 20.
Figure 22:
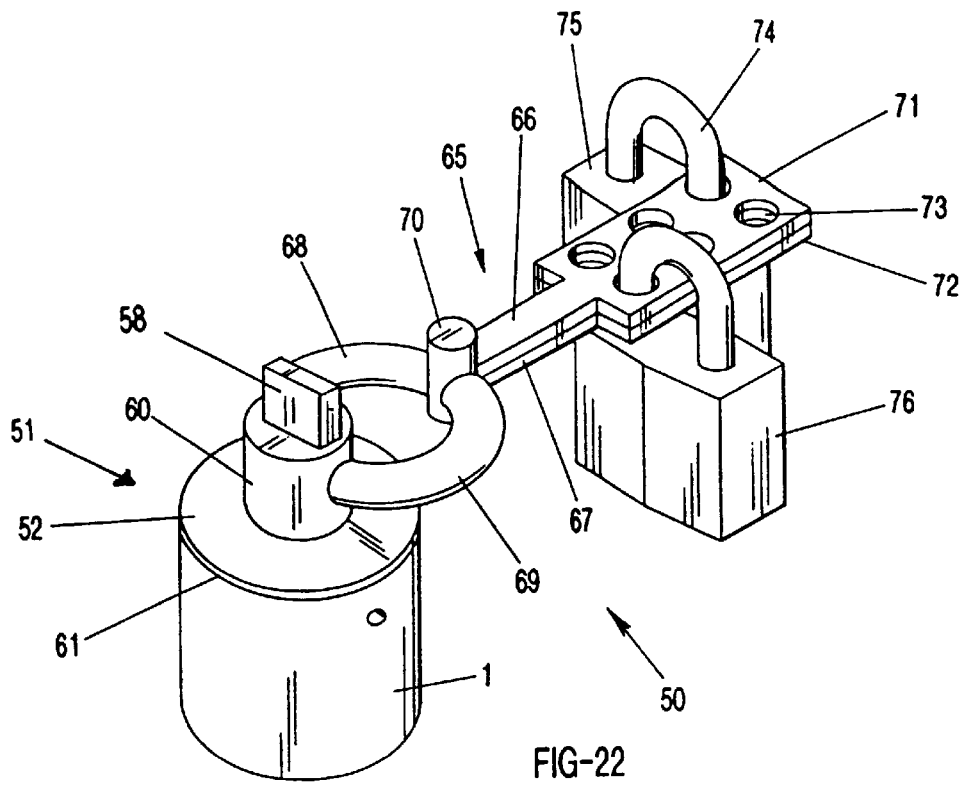
FIG. 22 is a perspective view of the scissors-like bail and two padlocks that are part of the third variation personal safety lockout device embodiment, shown in the locked position.
Figure 23:
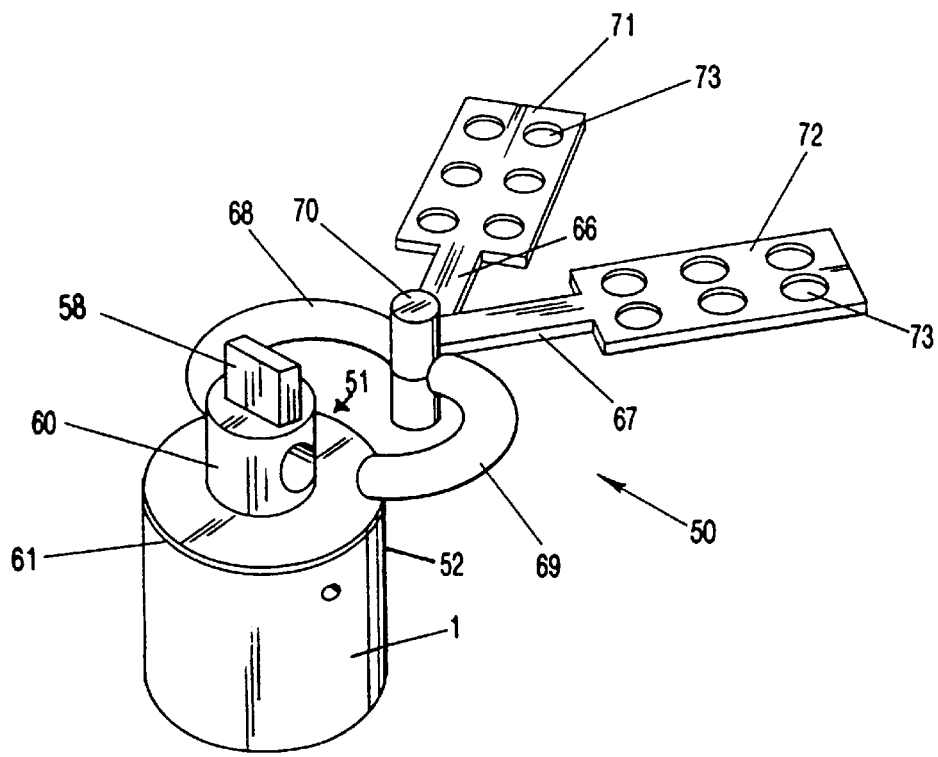
FIG. 23 shows the third variation of the safety lockout device shown in FIG. 22 in the unlocked position.

In FIGS. 17 through 23, there is shown a third variation of a personal lockout device, which may be used when in conjunction with the fifth embodiment of the lockout device shown in FIGS. 14–16. The complete personal safety lockout device 50 is shown in FIGS. 22 and 23. As seen in FIGS. 17–19, the device 50 comprises a cap assembly 51 having a plate 52 that is of the same approximate diameter as the diameter of handle 1. Plate 52 has a central opening 53 (see FIG. 19) receiving a shaft 54 having an opening 55 for receiving a pin 56. The shaft 54 is integral with a stem 57 having a rectangular free-end section 58 and a horizontally disposed cylindrical opening 58. The stem 57 is received in a cylindrical housing 60 that is welded or otherwise permanently secured to plate 52 and having a horizontally disposed cylindrical opening, 61 perpendicular to the longitudinal axis of the stem 57. The stem 57 and shaft 54 are secured to the cap and cylindrical housing, 52 and 60, through a retainer collar 62 (see FIG. 18 or 19) having an opening 63 for receiving the shaft 54 and a perpendicular opening 64 for receiving pin 56 thereby securing the collar 52 to the shaft 54 and completing the assembly of the cap 51. As may be seen in FIGS. 17 through 19, the stem 57 may be rotated by the use of a wrench, such as a Crescent wrench, applied to the rectangular free end portion 59 of stem 57 so that the opening 59 in stem 57 may be aligned with the cylindrical opening 61 in the cylindrical body 60, as shown in FIG. 19. When the holes 59 and 61 are in registry, the collar 52, because shaft 54 is not co-axial with stem 57, projects laterally outwardly.

As in the second variation of a personal or safety lockout device shown in FIGS. 14 through 16, the handle 1 includes a central bore including a shoulder 36 formed in such bore. When desired, the personal safety lockout device 50 may be employed by placing the cap assembly 51 over the top of the handle body 1 and rotating stem 57 so that holes 59 and 61 are aligned and, as seen best in FIG. 21, the collar 52, which is eccentrically mounted to the axis of stem 57 will engage the shoulder 36 of the handle 1, thereby locking the safety lockout device 50 to the handle 1. In this position, the cap 52 overlies the key locking mechanism 3, thereby preventing operations personnel access to change the setting of the handle 1 thereby changing the setting of the energy control device. As seen in FIGS. 22 and 23, the stem 57 is locked in the position where the holes 59 and 61 are aligned and the collar engages the shoulder 36, thereby preventing access to the key locking mechanism 3 by a scissors-like bail indicated generally at 65. The bail 65 includes two identical scissor arms 66 and 67. Each scissor arm at one end includes one half of a ring, such ring section 68 attached to arm 67 and ring section 69 attached to arm 66. The arms 66 and 67 are pivotally connected through a hinge 70. At the opposite end of each arm 66 and 67 are integral plates 71 and 72 with multiple openings 73. The bails 74 of multiple padlocks such as 75 and 76 may be used to lock the scissors-like bail 65 in a position whereby ring portions 68 and 69 are inserted in openings 61 and 59 in the safety lockout cap 51 preventing rotation of the stem 57 and thereby removal of the cap 52 from its overlying locking position over key locking mechanism 3 in handle 1. As seen best in FIG. 23, the scissors-like bail 65, after removal of all padlocks from the registered openings 73 in the flat plate portions 71 and 72 of arms 66 and 67 may be spread so that half ring sections 68 and 69 may be removed from opening 61 in cylindrical housing 60 of lockout device cap 51 so that by applying a wrench to the rectangular body 59 at the free end of stem 57, thereby rotating the collar 52 so as to disengage from the shoulder 46 of housing 1 allowing lockout cap 51 to be disengaged from handle 1 permitting access to key locking mechanism 3 will permit resetting of the rotational position of the shaft of the energy control device.

Referring now to FIGS. 24A through 27, there is shown a fourth variation of a personal lockout device 80 (see FIGS. 26 and 27 for the complete assembly) comprising a cap 81. Cap 81 as seen best in FIGS. 24A through 25B, comprises a first plate member 82 of circular configuration so as, in the two previous variations of personal or safety lockout devices, completely overlies the top surface of the handle 1 thereby preventing access to the operations lockout device key locking mechanism 3. The plate 82 has a downwardly depending circular housing 83 with an opening for receiving a shaft. The plate 82, at one location, has a tab 85 with an opening 86 for receiving the bail of a padlock as described below. Overlying plate 82 is a second plate 87 of identical configuration to plate 82 including a tab 88 having an opening 89 that, as seen in FIG. 24B, when the plates 82 and 87 are rotated relative to one another, will be in registry in one position. When the openings 86 and 89 are in registry, a collar 90 attached to the lower end of the shaft depending from the upper plate 87 and which is secured to the shaft by a pin 91 will be laterally offset since the shaft is not coaxial with center of plate 87, as seen best in FIG. 25B, thereby locking the safety lockout cap 81 to the handle 1 by engagement of the collar 90 with the shoulder 46, exactly as in the previously described variation of a safety lockout device.

Figure 26:
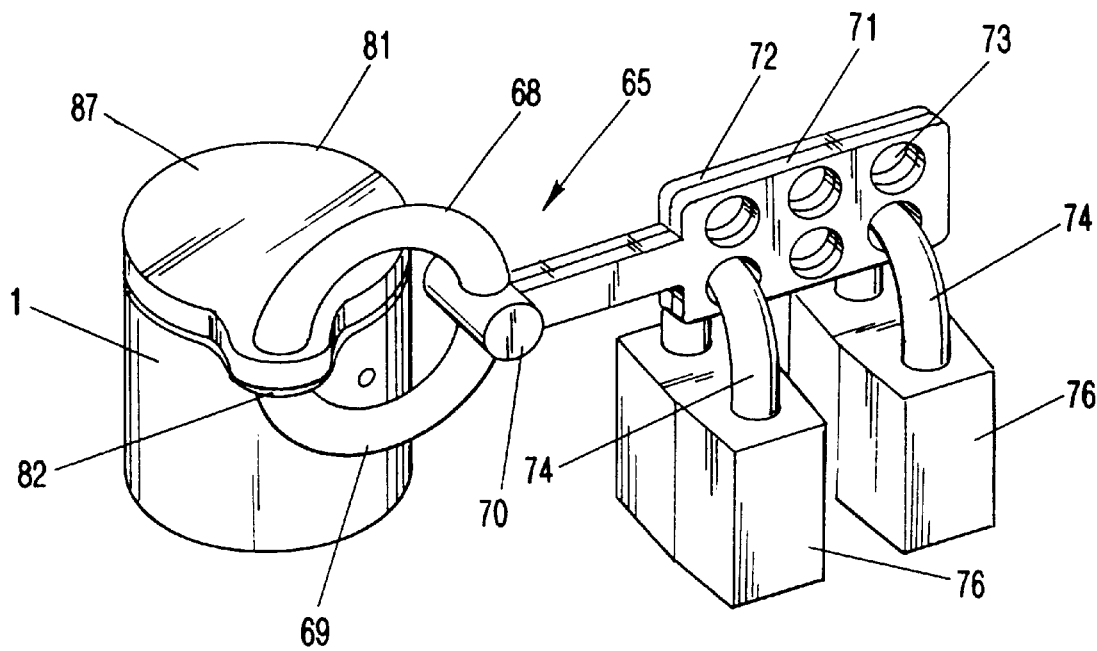
FIG. 26 shows the complete assembly of the fourth variation of the personal locking device in the locked position showing two padlocks.
Figure 27:
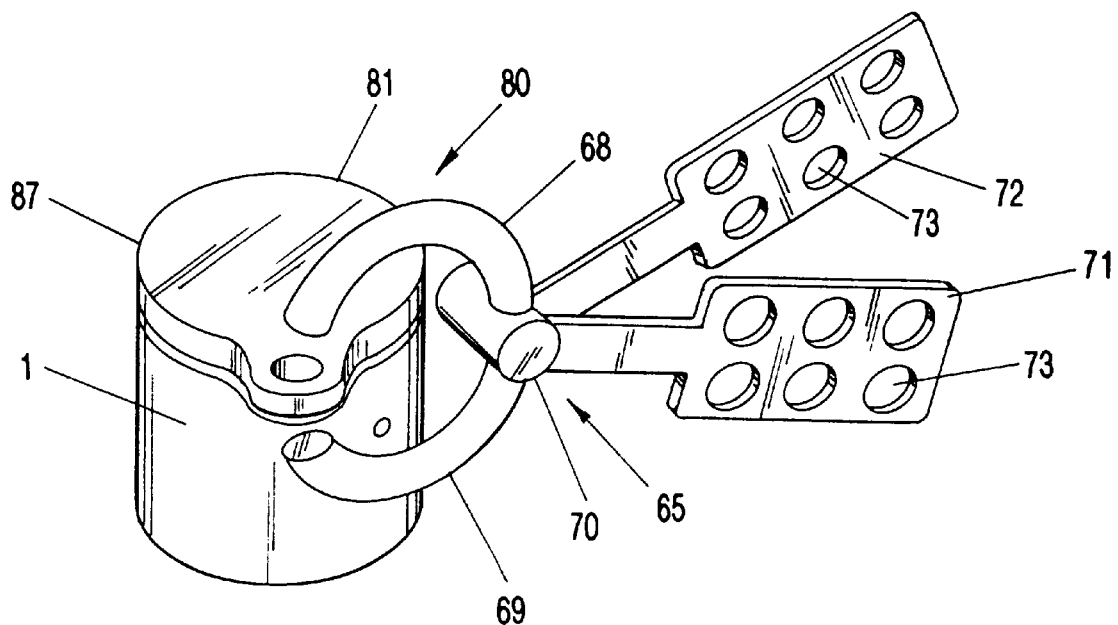
FIG. 27 is another perspective view as in FIG. 26 but showing the fourth variation of the personal or safety lockout device in the unlocked position.

As seen best in FIGS. 26 and 27, the complete assembly 80 of the fourth variation of the safety lockout device includes a bail identical to the bail 65 shown and described in FIGS. 22 and 23. As in that embodiment, the bail 65 includes half ring portions which when in locked position are inserted into openings 86 and 89 of plates 82 and 87 preventing rotation of plate 87 with respect to 82 thereby preventing disengagement of collar 90 from shoulder 46 as to prevent removal of safety lockout device 80 allowing access to key locking mechanism 3.

Figure 30:
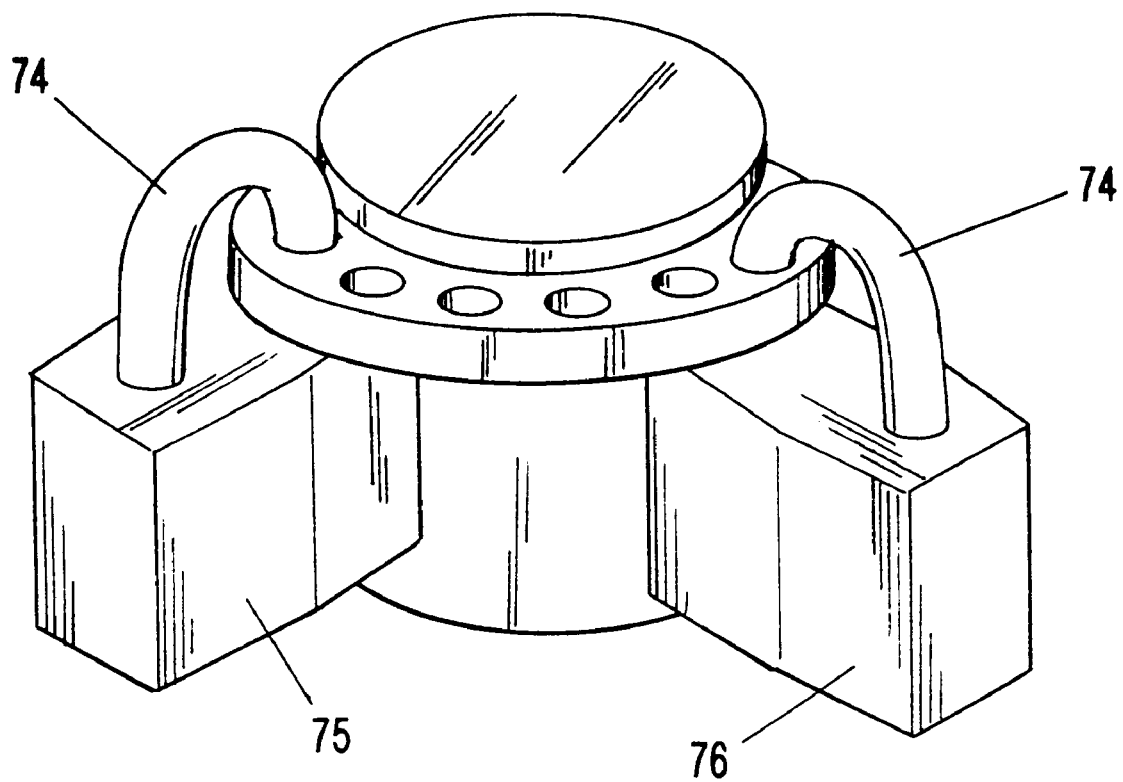
FIG. 30 is a perspective view of the complete fifth variation of the safety lockout device shown in the locked position with two padlocks.

In FIGS. 28 through 30 there is shown a fifth variation of a safety lockout device 100 comprising a safety lockout cap 101 which is similar to the cap 81 in the fourth variation shown in FIGS. 24 through 27. The cap 101 has a lower plate 102 which completely overlies the upper surface of the handle 1 and is of similar configuration. Depending from plate 102 is a cylindrical housing 103 for receiving a shaft (not shown). The plate 102 has an arcuate section 104 having a plurality of holes such as 105 each of which may receive the bail of a padlock, as explained below. The safety lockout cap 101 includes an upper plate 107 with a downwardly depending shaft, as previously described, that fits through the cylindrical housing 103 and is then attached to a collar 108 that is eccentrically mounted relative to the center line of cylindrical housing 103. Upper plate 107 has an arcuate section 109 identical to arcuate section 104 on plate 102 and having the identical openings such as 110 that as seen best in FIG. 28B, when the two plates are rotated to a specific position are in registry with all of the openings 105.

As seen best in FIG. 30, when plates 102 and 107 are aligned, as shown in FIG. 29B, so that the openings 105 and 110 are in registry, the bail 74 of a padlock 75 may be inserted through openings 105, 110 to thereby lock plate 107 and plate 102 by engagement of the collar 108 with shoulder 36 in the handle 1 to prevent access to the upper surface of handle 1 and therefore the operation key locking mechanism 3.

In application, it will of course be desirable to use the same lockout device throughout an entire facility. Authorized operations personnel will have a key permitting access to the handle of all of the operations control devices at such facility. Since all operations lockout devices will be the same, training will be simplified. A single key could be used for all authorized personnel. While all operations lockout devices may have the same mechanical construction, the operations lockout devices on certain equipment, or portions of a system, could be color-coded with matching color-coded keys and thus there would be various groups of authorized personnel who could operate different operating control devices. To provide the extra level of safety protection for service and maintenance personnel, a safety lockout device, such as 9, 40, 50, 80 or 100, could be issued to each individual service or maintenance person at the facility. Since all handles of the control devices are identical, a service person could attach the safety lockout devices onto any handle in the facility, thus assuring that the position of the valve could not be altered during maintenance operations. It will be apparent that in some maintenance operations the service personnel must first have access to the operations key locking mechanism 3 from an authorized operations person, to allow the control device to be reset to the OFF position, at which point the personal safety lockout device could be engaged assuring that no energy could flow through the control device during the maintenance operation.

Although the invention has been described with particular reference to a number of different embodiments, still other embodiments and alternatives will achieve the same results based on the same inventive concept. Variations and modifications of these embodiments in the present invention will be obvious to those skilled in the art. However, the invention is intended to cover in the appended claims all modifications and equivalents of the physical embodiments shown and described in this specification. The entire disclosures of all references, applications, patents, and publications cited above, and of the corresponding application(s), are hereby incorporated by reference.

We claim:

1. A lockout apparatus for use with an energy controlling apparatus, such as a valve or regulator, having a rotatable shaft that may be manually set at a desired position to control the flow of energy through said apparatus, the device preventing further rotation of the shaft, comprising:

a generally cylindrical handle body having an opening at a lower end of said body for receiving the rotatable shaft and a second cylindrical opening in an upper end of said body;

engagement means mounted on the rotatable shaft for fixed rotation therewith;

bearing means mounted within said handle lower opening for rotatively supporting said engagement means;

a key locking mechanism mounted in said second cylindrical opening in the upper end of said handle body and including a key-actuated center cylinder having a locking dog movable from a first position disengaged from said engagement means to a second position engaged with said engagement means;

ratchet means, having a plurality of notches, fixedly secured to said engagement means; and a ball movably disposed on said handle body;

means for biasing said ball toward said ratchet, whereby when said housing is not coupled to said engagement means, said ball moves into selective engagement with one of said notches to prevent the handle from rotating in one direction, wherein when said locking dog is in said first position, the handle rotates relative to the engagement means and rotatable shaft of the energy controlling apparatus and in the second position is rotatably fixed with said engagement means and rotatable shaft so as to permit rotation of the handle to effect like rotation of the shaft of the energy controlling apparatus.

2. An apparatus according to claim 1 wherein said engagement means comprises a gear.

3. An apparatus according to claim 1 additionally including a retaining ring for fixing said bearing means within said handle lower opening.

4. An apparatus according to claim 1 wherein said handle has a central bore above said lower cylindrical opening and additionally comprising a jam nut that secures said handle to the energy controlling apparatus shaft and a handle cap covering said bore in said handle to prevent access to the jam nut.

5. An apparatus according to claim 1 additionally comprising a personal lockout device comprising an enclosure that substantially surrounds the handle body, the enclosure including a top plate having an opening at one end through which the bail of a plurality of padlock may be inserted such that when at least one padlock is in the locked condition the bail and enclosure prevent removal of the personal lockout device from the handle body and thereby prevents access to the key locking mechanism.

6. An apparatus according to claim 1 wherein said ratchet comprises a wheel fixedly secured to said engagement means, said ball comprises a sphere of constant radius, and said notches define arcs comprising radii substantially equal to said radius of said sphere.

7. An apparatus according to claim 6 wherein said means for biasing comprises a coil spring.

8. An apparatus according to claim 7 wherein said sphere is movable along an imaginary line skewed in relation to said rotatable shaft.

9. An apparatus according to claim 6 wherein said ratchet wheel is integral with said gear.

10. A lockout apparatus for a valve having a stem comprising:

a generally cylindrical handle body having a cylindrical opening at a lower end of said body, said opening having a first diameter for receiving the valve stem;

a drive gear having a plurality of teeth, mounted on the valve stem for rotation therewith;

bearing means adapted to be mounted within said cylindrical opening and concentrically and rotatably supporting said drive gear;

cylindrical locking means mounted within a cylindrical opening in an upper surface of said handle body and that is radially displaced from the axis of said body, including a key actuated center cylinder having a tab movable from a first position disengaged from the teeth of said drive gear to a second position engaging the teeth of said drive gear; and a ratchet within said opening for fixed rotation with said stem, a movable ball, and means on said handle body for biasing said ball toward said ratchet to prevent rotation of said valve stem when said tab is in said first position;

wherein said ball is movable under the influence of said means for biasing along an imaginary line skewed in relation to said rotatable shaft; and wherein when said locking means tab is in said first position, the housing is free to rotate relative to the drive gear and valve stem and in the second position is locked to said drive gear and valve stem so as to permit rotation of the housing to effect like rotation of the drive gear, thereby opening and closing the valve.

11. An apparatus according to claim 10 additionally comprising a retaining ring to retain said bearing means within said handle body.

12. An apparatus according to claim 10 additionally comprising a retaining ring to retain said drive gear within said handle body.

13. An apparatus according to claim 10 additionally comprising lock nut means for securing said handle body to said valve stem.

14. An apparatus according to claim 13 wherein said lock nut means comprises a spanner wrench hole pattern on a top thereof.

15. An apparatus according to claim 14 additionally comprising an assembly tool having a spanner wrench hole pattern matching that of said lock nut means.

16. An apparatus according to claim 14 additionally comprising a retaining pin securing said lock nut means to said handle body.

17. An apparatus according to claim 10 additionally comprising a handle cap covering a top of said handle body to permit detection of tampering.

18. An apparatus according to claim 10 additionally comprising personal ownership cap and padlock means covering said handle body.

19. An apparatus according to claim 10 wherein said locking means when engaged prevents opening of a valve but permits closing of the valve.

20. An apparatus according to claim 10 wherein said locking means provides free-wheel rotation of said handle body in one direction.

21. An apparatus according to claim 20 wherein said handle body engages said locking means when rotated in an opposite direction.

\* \* \* \* \*